US010393221B2

(12) United States Patent
Kobayashi et al.

(10) Patent No.: US 10,393,221 B2
(45) Date of Patent: Aug. 27, 2019

(54) DYNAMIC DAMPER

(71) Applicant: UNIPRES CORPORATION, Yokohama-shi, Kanagawa (JP)

(72) Inventors: Atsushi Kobayashi, Fuji (JP); Yutaka Murata, Fuji (JP)

(73) Assignee: UNIPRES CORPORATION, Yokohama-Shi (JP)

( * ) Notice: Subject to any disclaimer, the term of this patent is extended or adjusted under 35 U.S.C. 154(b) by 266 days.

(21) Appl. No.: 15/351,578

(22) Filed: Nov. 15, 2016

(65) Prior Publication Data

US 2017/0122403 A1    May 4, 2017

Related U.S. Application Data

(63) Continuation of application No. PCT/JP2015/076858, filed on Sep. 24, 2015.

(30) Foreign Application Priority Data

Sep. 25, 2014    (JP) ................................. 2014-195030

(51) Int. Cl.
*F16F 15/14* (2006.01)
*F16H 47/08* (2006.01)
(Continued)

(52) U.S. Cl.
CPC ...... *F16F 15/13157* (2013.01); *F16F 15/134* (2013.01); *F16F 15/13469* (2013.01);
(Continued)

(58) Field of Classification Search
CPC ........... F16F 15/13157; F16F 15/13469; F16F 15/134; F16F 15/1478; F16F 15/1206;
(Continued)

(56) References Cited

U.S. PATENT DOCUMENTS 6,066,058 A    5/2000    Kashiwase
6,099,428 A    8/2000    Kashiwase
(Continued)

FOREIGN PATENT DOCUMENTS

DE    19628411 C2    1/1998
JP    07-208546 A    8/1995
(Continued)

*Primary Examiner* — Charles A Fox
*Assistant Examiner* — Lillian T Nguyen
(74) *Attorney, Agent, or Firm* — Foley & Lardner LLP

(57) ABSTRACT

The present invention relates to a dynamic damper provided with a planetary dear device and damper springs and aims to obtain an increased adjustable range of gear ratio for obtaining a desired reduction of rotating fluctuation and to reduce a size in a radial direction. A plurality of planetary gears 34 are provided, each forms a stepped shape (Ravigneau type planetary gear device) and is constructed by a small diameter pinion 42 and a large diameter pinion 44 juxtaposed in an axial direction so as to be rotated integrally. Rotating elements, which are selectively and desirably arranged to mesh with the small diameter pinion 42 and the large diameter pinion 44, are large diameter and small diameter ring gears and large diameter and small diameter sun gears. In addition to a carrier connecting the plurality of stepped shaped planetary gears 34, two rotating elements are selected from the large diameter and small diameter ring gears and the large diameter and small diameter sun gears. Among the selected elements, two selected rotating elements, for example, the large diameter sun gear and the carrier are assigned to the inlet and the outlet elements, respectively and the remaining small sun gear 40 is assigned to the mass element.

4 Claims, 19 Drawing Sheets

(51) Int. Cl.
*F16F 15/131* (2006.01)
*F16F 15/134* (2006.01)
*F16H 45/02* (2006.01)

(52) U.S. Cl.
CPC .......... *F16H 45/02* (2013.01); *F16F 15/1478* (2013.01); *F16H 2045/0226* (2013.01); *F16H 2045/0268* (2013.01)

(58) Field of Classification Search
CPC ............. F16H 45/02; F16H 2045/0268; F16H 2045/0226; F16H 1/28
See application file for complete search history.

(56) References Cited

U.S. PATENT DOCUMENTS

| | | |
|---|---|---|
| 6,126,568 A | 10/2000 | Sudau |
| 7,640,734 B2 | 1/2010 | Ochi et al. |
| 8,360,914 B2 | 1/2013 | Ohashi et al. |
| 8,677,741 B2 | 3/2014 | Ota et al. |
| 8,961,346 B2* | 2/2015 | Murakami .......... F16F 15/1478 475/347 |
| 2011/0005216 A1 | 1/2011 | Yamashita et al. |
| 2014/0274561 A1* | 9/2014 | Ukon .................. F16F 15/1478 477/175 |
| 2016/0160957 A1* | 6/2016 | Dieckhoff ........... F16F 15/1206 192/3.28 |

FOREIGN PATENT DOCUMENTS

| | | |
|---|---|---|
| JP | 2008-163977 A | 7/2008 |
| JP | 2008-164013 A | 7/2008 |
| JP | 2009-156425 A | 7/2009 |
| JP | 2010-101380 A | 5/2010 |
| JP | 2011-208805 A | 10/2011 |
| JP | 2013-087827 A | 5/2013 |

* cited by examiner

Fig.3

COMBINATIONS AS TAKEN BY THE PRESENT INVENTION

| INPUT | DAMPR MASS | OUTPUT | | | | |
|---|---|---|---|---|---|---|
| | | SunA | SunB | Carr | RingB | RingA |
| SunA | SunB | | | 1 | 2 | 3 |
| | Carr | | 4 | | 5 | 6 |
| | RingB | | 7 | 8 | | 9 |
| | RingA | | 10 | 11 | 12 | |
| SunB | SunA | | | 13 | 14 | 15 |
| | Carr | 16 | | | 17 | 18 |
| | RingB | 19 | | 20 | | 21 |
| | RingA | 22 | | 23 | 24 | |
| Carr | SunA | | 25 | | 26 | 27 |
| | SunB | 28 | | | 29 | 30 |
| | RingB | 31 | 32 | | | 33 |
| | RingA | 34 | 35 | | 36 | |
| RingB | SunA | | 37 | 38 | | 39 |
| | SunB | 40 | | 41 | | 42 |
| | Carr | 43 | 44 | | | 45 |
| | RingA | 46 | 47 | 48 | | |
| RingA | SunA | | 49 | 50 | 51 | |
| | SunB | 52 | | 53 | 54 | |
| | Carr | 55 | 56 | | 57 | |
| | RingB | 58 | 59 | 60 | | |

Fig.4

COMBINATIONS AS TAKEN BY THE PRIOR ART

| | | OUTPUT | | |
|---|---|---|---|---|
| | | Ring | Carr | Sun |
| INPUT | Ring | | 1 | 2 |
| | Carr | 3 | | 4 |
| | Sun | 5 | 6 | |

DYNAMIC DAMPER

TECHNICAL FIELD

The present invention relates to a dynamic damper provided with a planetary gear device and is capable of being used in a power transmission system of an internal combustion engine for transmitting a driving force from a crankshaft to a transmission device via a hydraulic pressure type torque converter, the dynamic damper being for a reduction of a fluctuation in rotating movement when a lock up operation is carried out.

BACKGROUND TECHNOLOGY

In a driving system for a vehicle provided with a torque converter, a lock-up operation, whereat a power transmission is occurred without relying on a hydraulic pressure, causes a variation in a rotating movement of the engine to be directly transmitted to a gear train without any intervention of the torque converter. Dynamic dampers have thus been proposed, provided with planetary gear devices for obtaining an effective reduction of the rotating movement fluctuation during the execution of the lock-up operation. See Patent Documents 1 to 5. In any of dynamic dampers in these patent documents, a normal type of planetary gear device has been employed, which includes a plurality of planetary gears, each of which is formed as a straight pinion and has three rotating elements, that are a sun gear, a ring gear and a carrier, on which carrier the planetary gears are rotatably connected. The patent documents 1 to 5 are different with each other so long as the manners of mutual connection between the sun gears, the ring gears, the carriers and resilient members are concerned. These the documents 1 to 5 disclose however substantially identical ideas not only in the point of a structure that, among the sun gear, the ring gear and the carrier, a selected first element is connected to the crankshaft as a driving part and a selected second element is connected to the transmission device as a driven part, among the sun gear, the ring gear and the carrier, selected two elements are connected with each other by means of the resilient members for causing the selected two elements to participate a power transmission between the driving part and the driven part, on one hand and, on the other hand, among the sun gear, the ring gear and the carrier, a third element which is freely rotated and does not participate in the power transmission function makes the third element to operate as a damper mass but also in the point of the aimed function that an effective reduction of the fluctuation in the rotating movement is obtained by employing the planetary gear device.

PRIOR ART DOCUMENTS

Patent Document

Patent Document 1: JP H11-159595
Patent Document 2: JP 2010-101380
Patent Document 3: JP 2008-163977
Patent Document 4: JP H07-208546
Patent Document 5: JP 2008-164013
Patent Document 6: JP 2013-87827

SUMMARY OF THE INVENTION

Problems to be Solved

In the conventional type of the dynamic damper of planetary gear type, having a plurality of planetary gears, each being constructed as a straight pinion, it is possible to provide only three rotating elements, that are single sun gear, single ring gear and single carrier on which the planetary gears (straight pinions) are rotatably connected, which makes therefore to provide a structure wherein the first of the three rotating elements is connected to the input side, the second rotating element is connected to the output side and the remaining third rotating element is arranged to function as a damper mass. Due to the provision of only three rotating elements, a limitation is accompanied so long as the number of teeth of the gear is concerned. There is, for example, a limitation that the number of the teeth of the ring gear must be larger than that of the sun gear. Such a limitation makes a range of values of gear ratio to be narrow, which is employable in an actual design of a damper. The narrow range of the employable gear ratio may result in a selectable range to be narrow not only the damper mass is concerned but also the damper spring is concerned. As a result, a situation may arise that a connection of an additional member of a larger weight is needed for the rotating element functioning as the damper mass for obtaining a desired value of damper mass, which causes a loss of energy to be increased in the process of the power transmission, resulting in a reduced acceleration performance of the vehicle.

Furthermore, an arrangement of the planetary gear device in the prior art is such that the ring gear, the sun gear and the pinion gears meshing with the ring gear as well as with the sun gear are generally arranged in a radial plane, resulting in an increased radial dimension as well as an increased weight of the entire torque converter apparatus. The increased redial size of the entire apparatus makes a problem of interference to be likely generated with respect to a transmission case for the storage of the damper therein. In relation to this problem, the transmission case is usually located at a position of the vehicle body of limited space in the direction of the height of the vehicle and it is therefore generally be requested that the radial dimension of the damper should be as small as possible.

Means for Solving the Problems

The present invention is induced in view of the above mentioned problems in the prior arts and is to provide a dynamic damper comprising a planetary gear device, which comprises a plurality of double pinion planetary gears arranged spaced along a circumferential direction, each double pinion planetary gear having a first and a second pinions of different numbers of teeth arranged integrally rotatably in an axially juxtaposed relationship with each other, at least two rotating gear elements, which mesh with the first and the second pinions, respectively, at least at respective one sides of an inner and an outer sides of the corresponding rotating elements, and a carrier element for supporting rotatably the plurality of the double pinion planetary gears. One element selected from at least two rotating element and the carrier element are connected to an input side. The dynamic damper further comprises resilient members for connecting, each other, two rotating elements selected from at least two rotating gear elements and the carrier elements. The resilient members are for making the selected two elements to participate a power transmission to an output side from the input side. In at least two rotating elements and the carrier element, a rotating elements or rotating elements of no participation in the power transmission is or are arranged so as to function as a damper mass or damper masses.

In an embodiment of the present invention, a provision of a first and a second sun gears as the rotating gear elements is made, on one hand and, on the other hand, a provision is not mage so long as a first nor a second ring gears is concerned. In this embodiment, one of the first sun gear, the second sun gear and the carrier is connected to the input side and another one of the first sun gear, the second sun gear and the carrier is connected to the output side. The resilient members are arranged so as to connect selected two of the first sun gear, the second sun gear and the carrier with each other so as to cause the selected two elements to participate in a power transmission between the inlet and output sides. Finally, in the first sun gear, the second sun gear and the carrier, remaining one, which does not participate in the power transmission function, is made so as to the remaining one element to function as a damper mass, As another modification of the present invention, a provision is not made as to a first nor second sun gear as rotating element. Contrary to this, a provision of a first and second ring gears as rotating elements are made. In the first and second ring gears and the carrier, one element is connected to the input side and another element is connected to the output side. In addition, the resilient members connect two elements selected from the first and second ring gears and the carrier with each other, so that the selected two elements participate in power transmission from the input side to the output side. Finally, in the first and second ring gears and the carrier, a remaining one element, which does not participate in the power transmission, is made so as to function as a damper mass. In the present invention, from maximum four rotating gear elements, including a large and a small sun gears at the inner side and a large and a small ring gears at the outer side, the minimum two rotating gear elements meshing the first and the second pinions, respectively, are essentially needed. One or two rotating gear element or rotating gear elements may however be added. In this case, the added rotating gear element(s) may be connected to the rotating element at the inlet or output side by way of resilient members. The added rotating gear element(s) may also be used as an additional damper mass.

For obtaining a desired damping characteristic of the dynamic damper in the present invention, it is preferable that a relative rotation ratio i is determined in a manner that a transmission rate of rotational fluctuation from the input side to the output side has a value as small as possible, which relative rotation ratio i is defined as a ratio of a rotational displacement (angular displacement) $\theta_1$-$\theta_2$ on a velocity line between the input side rotating element and the output side rotating element to a rotational displacement $\theta_2$-$\theta_3$ on the velocity line between the output side rotating element and the rotating element functioning as a damper mass, wherein the velocity line is expressed in a two dimensional orthogonal coordinate system, which is constructed by a first axis on which a planetary gear ratio is taken, which is, with respect to a predetermined rotational speed value between selected two elements in the planetary gear device, a value or values of remaining a rotating element or elements and by a second axis on which the rotating speed is taken and wherein the velocity line becomes a straight line in the coordinate system, on which straight line values of the rotational speed are located for the values of the planetary gear ratios for the respective rotating elements. Furthermore, in case where a rotating element connected to the input side (input side rotating element) or a rotating element connected to the output side (output side rotating element) is, with respect to the remaining rotating elements, is arranged at the center of the above mentioned velocity line, a determination of the relative rotation ratio i for obtaining the value of the transmission rate from the input side to the output side of a value as small as possible may be done by an arrangement of the rotational displacement $\theta_3$ of the rotating element assigned to a damper mass to be located as close as possible to the rotational displacement $\theta_1$ of the input side rotating element or the rotational displacement $\theta_2$ of the output side rotating element located at the center of the velocity line. In case where a rotating element functioning as a damper mass is located between the input side rotating element and the output side rotating element and the damper spring is arranged between the rotating element assigned to a damper mass and input side rotating element or the output side rotating element, a determination of the relative rotation ratio i for obtaining the value of the transmission rate from the input side to the output side of a value as small as possible can be done by an arrangement of the rotational displacement $\theta_3$ of the rotating element assigned to a damper mass located as close as possible to the rotational displacement $\theta_1$ of the input side rotating element or the rotational displacement $\theta_2$ of the output side rotating element located on a connected side to the damper spring.

Effects of the Invention

In the present invention, the planetary dear apparatus may be provided with maximum five rotating element, which include, essentially, a carrier on which a plurality of double pinion planetary gears, each including a first and a second pinions of different numbers of teeth, are rotatably supported and includes, selectively, a large and a small two ring gears and a large and a small two sun gears, the ring gears and sun gears meshing selectively with the first and second pinions. From these five elements, assignments to the three essential components of the planetary gear device, that are elements connected to the inlet member and the outlet member, respectively, and at least one element functioning as a damper mass, becomes thus possible according to the present invention, resulting in a wide range of a selectable value of the gear ratio, on one hand and, on the other hand, an increased degree of freedom of an arrangement of the apparatus, which makes it easy to obtain an optimized arrangement of a planetary gear type dynamic damper for a reduction of rotational fluctuation.

The arrangement that a provision of the first and the second sun gears is made and a provision is not made so long as a first nor a second ring gears is concerned or the arrangement that a provision is not made so long as a first and a second sun gears is concerned and a provision of the first and the second ring gears is made is advantageous in a space economy in radial direction, resulting in a reduced radial size of the entire apparatus, which is advantageous in a usual construction of a vehicle body of limited usable space in a direction of height at a part of location where the torque converter is to be arranged. The increased usable size in the radial direction of the planetary gear device is advantageous from the viewpoint for keeping a desired strength of the gear members.

From a result of dynamic analysis, in order to obtain an effective control of a rotational fluctuation, it has been clarified that a desired setting of the relative rotating ratio i is needed in accordance with the particular way how the input side rotating element, the output side rotating element and the rotating element as the damper mass are arranged on the velocity line. The desired setting of the relative rotating ratio i can easily be attained by the above mentioned large degree of the freedom in the gear ratio setting by employing the planetary gear device according to the present invention.

BRIEF EXPLANATION OF ATTACHED DRAWINGS

FIG. 3 is a diagram illustrating all of combinations as illustrated by serial numbers 1 to 60 concerning all possible assignments to three functions of an inlet, an outlet and a damper mass selected from five rotating elements in case where the dynamic damper system is constructed by the Ravigneau type planetary gear device.

FIG. 4 shows a diagram illustrating all of combinations as illustrated by serial numbers 1 to 6 concerning all possible assignments to three functions of an inlet, an outlet and a damper mass selected from three rotating elements in case where the dynamic damper system is constructed by a conventional type planetary gear device having three rotating elements.

Figure 10:
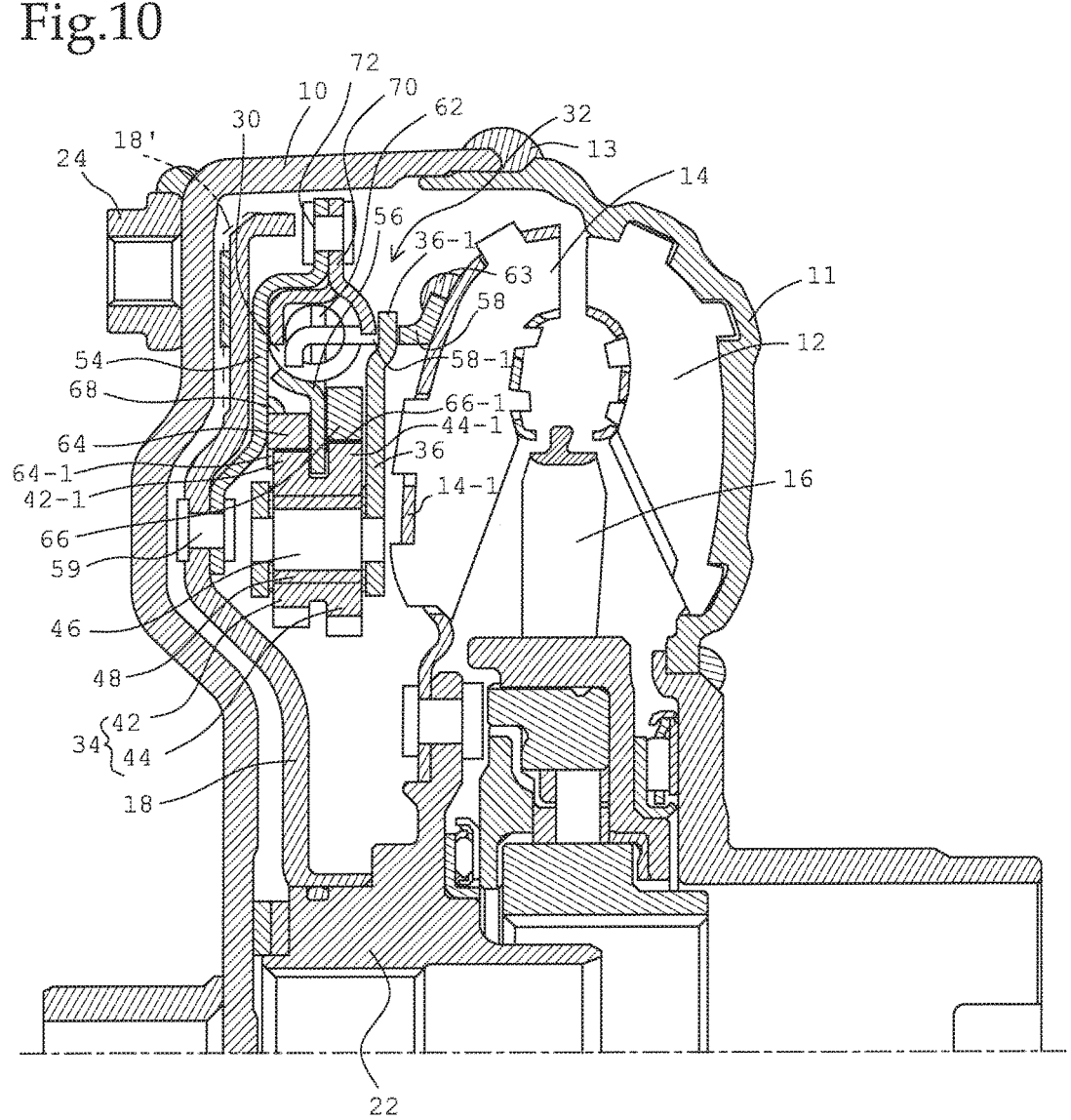
FIG. 10 is a cross sectional view of torque converter provided with a dynamic damper having Ravigneau type planetary gear device in a third embodiment of the present invention.
Figure 19:
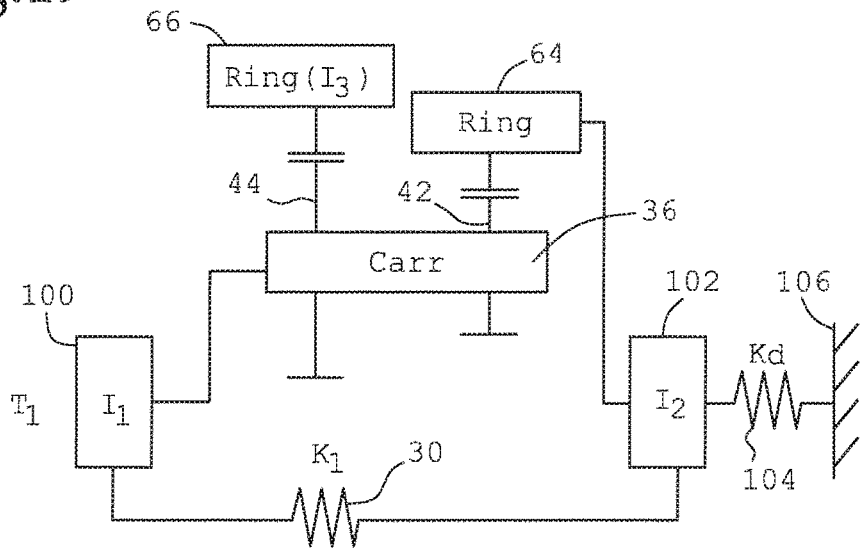

FIG. 19 is a schematic diagram illustrating a model for calculating a rotational fluctuation in the dynamic damper in an embodiment modified from the third embodiment shown in FIG. 10 in that, first, the small diameter pinion and the large diameter pinion are axially reversed and that, second, the carrier is assigned to the inlet element, the small diameter ring gear to the outlet element and the large diameter ring gear to the mass element, respectively.

Figure 20:
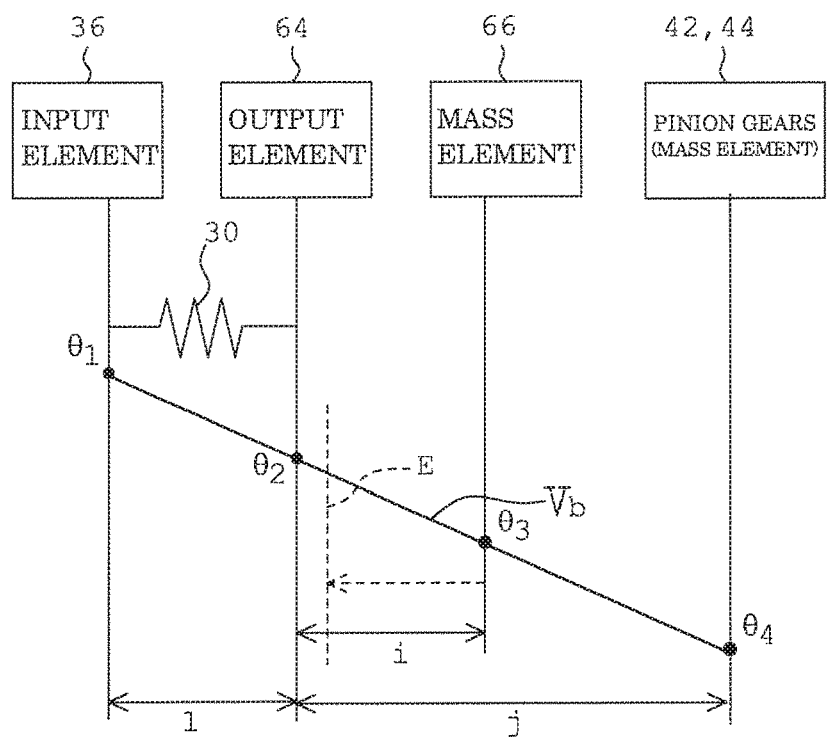

FIG. 20 is a graph showing displacement of each of the rotating elements on the velocity line in the embodiment in FIG. 19 as a modification of third embodiment of the present invention in FIG. 10.

Figure 21:
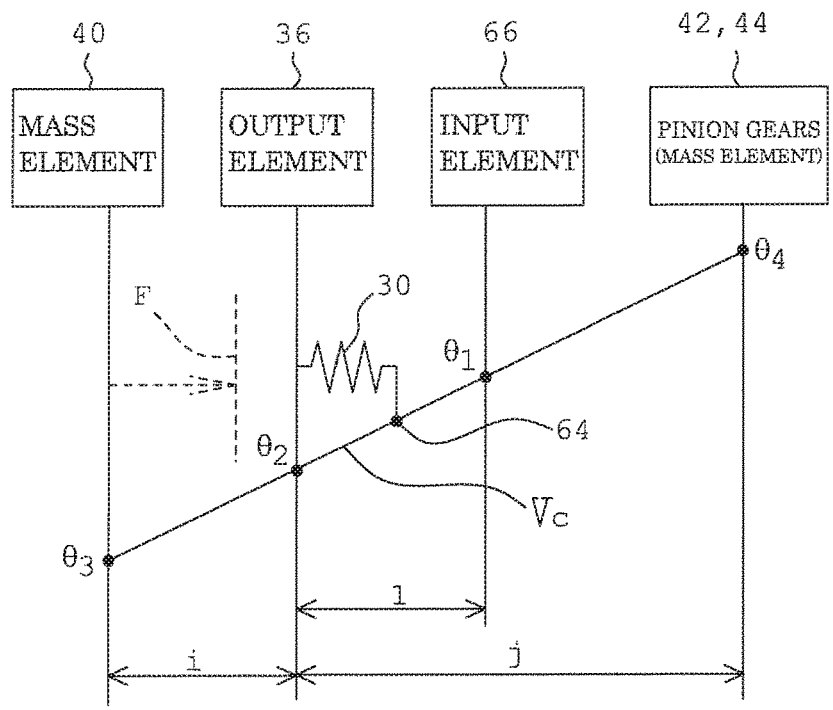

FIG. 21 is a graph showing displacement of each of the rotating elements on the velocity line in the fourth embodiment of the present invention in FIG. 10.

Figure 22A:
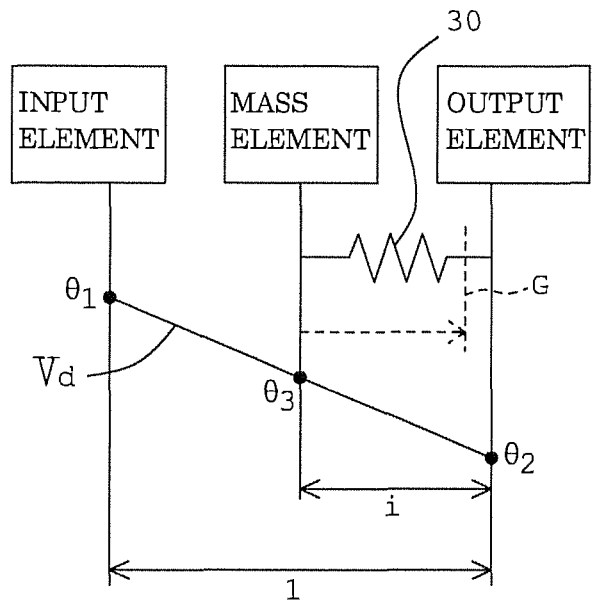
Figure 22B:
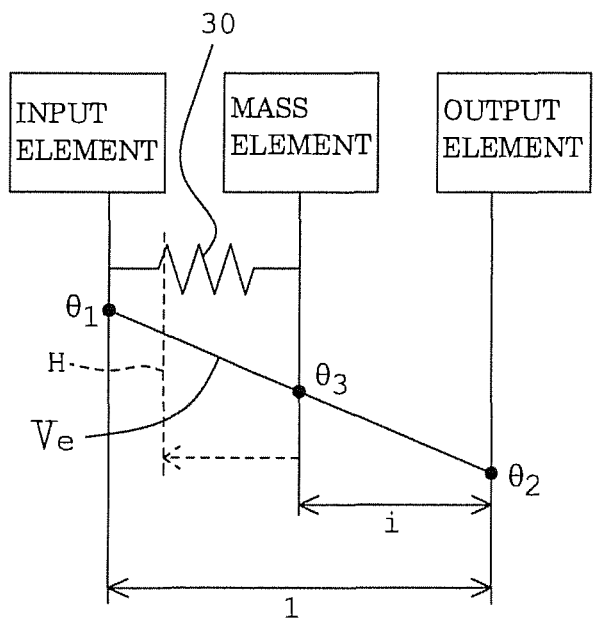

FIGS. 22A-22B are graphs each showing a velocity line when a mass element is located at the center, the part FIG. 22A illustrating when the damper spring is arranged between the mass element and the outlet element, the part FIG. 22B illustrating when the damper spring is located between the mass element and the inlet element.

Figure 23:
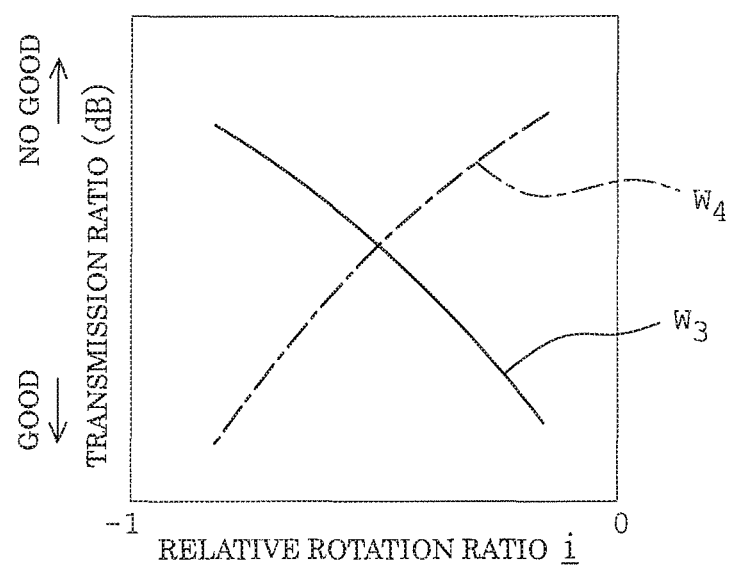

FIG. 23 is graphs showing schematically relationships of the transmission rate of torque fluctuation to the relative rotating ratio i in the construction shown in FIGS. 22A-22B where the central element is assigned to the mass element.

DESCRIPTION OF THE EMBODIMENTS

Figure 1:
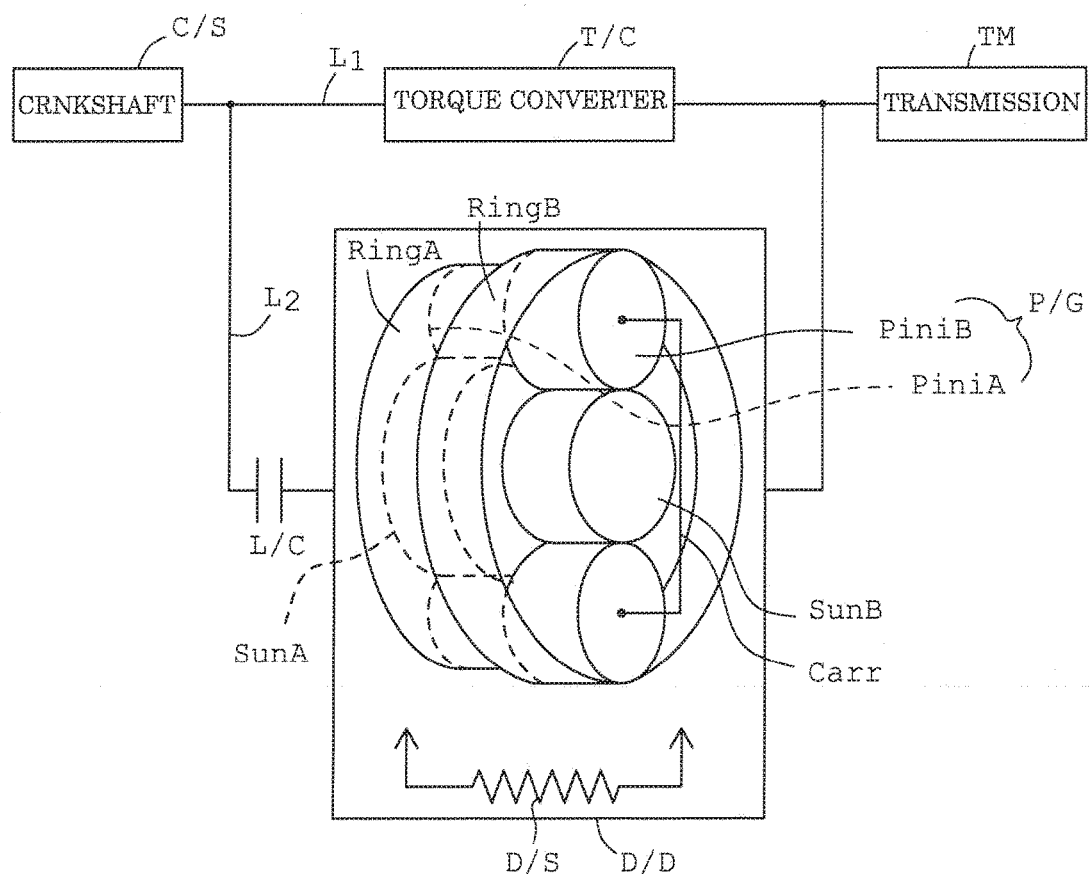
FIG. 1 is schematic perspective view of a drive train for a rotating movement from a crankshaft to a transmission device, provided with a planetary damper system having a Ravigneau type planetary gear device according to the present invention.

FIG. 1 illustrates a generalized arrangement of a planetary gear type dynamic damper D/D according to the present invention in power transmission train $L_1$ from a crankshaft C/S of an internal combustion engine to a transmission TM via a hydraulic torque converter T/C. The dynamic damper D/D is located on a train $L_2$ bypassing the power transmission train $L_1$. A lock-up clutch L/C is located on the bypassing line $L_2$. In a non-engaged condition of the lock-up clutch L/C, the engine power from the crankshaft is transmitted, via the torque converter T/C, to the transmission TM for obtaining a hydraulic power transmission and the dynamic damper D/D does not participate in the power transmission. In an engaged condition of the lock-up clutch L/C, the hydraulic torque converter T/C is in an idling condition and a power transmission by way of the bypassing system $L_2$ is obtained, so that the engine power from the crankshaft C/S is mechanically and directly transmitted to the transmission device TM. In this mechanical direct transmitting operation, the dynamic damper D/D operates to control a fluctuation in a rotating movement (rotational fluctuation). The dynamic damper D/D is of a type that utilizes a planetary gear device and damper springs. In the present invention, the planetary gear device is of so-called Ravigneau type, having planetary gears P/G of double planetary type, each including two pinions PiniA and PiniB, which rotate integrally and have different numbers of teeth. Ring gears RingA and RingB may be provided, which mesh with the pinions PiniA and PiniB, respectively at the outer sides of the pinions. Sun gears SunA and SunB may be provided, which mesh with the pinions PiniA and PiniB, respectively at the inner sides of the pinions. Furthermore, a carrier Carr is provided for supporting rotatably a plurality of or at least two of such planetary gears P/G. The Ravigneau type apparatus can have maximum five rotating element that are the ring gears RingA and RingB, the sun gears SunA and SunB and the carrier Carr. In the present invention, from the maximum five rotating elements, that are the ring gears RingA and RingB, the sun gears SunA and SunB and the carrier Carr, minimum three rotating elements including essentially the carrier may be selected in order to construct the dynamic damper. It should be noted that the sun gears SunA and SunB and the ring gears RingA and RingB correspond to the rotating gear elements according to the present invention.

Figure 2:
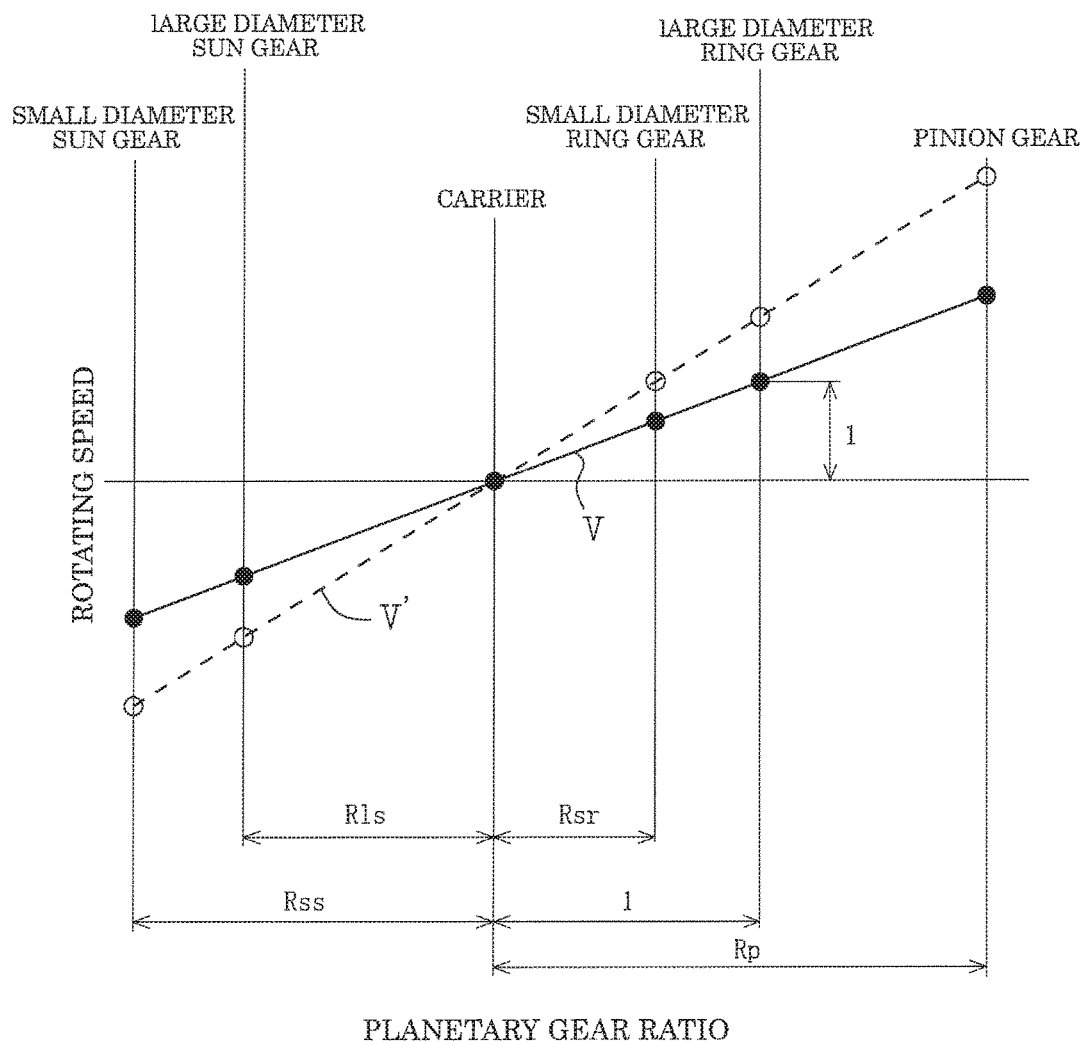
FIG. 2 is a graph (so-called velocity line chart) showing a relationship between planetary gear ratio and rotational speed for five rotating elements constructing the Ravigneau type planetary gear device.

FIG. 2 is a diagram showing a velocity line of the Ravigneau type planetary gear device having five rotating elements. The abscissa indicates planetary gear ratio and the ordinate indicates rotational speed (velocity). In FIG. 2, the carrier (Carr in FIG. 2) of rotational speed of zero at the origin is assigned to the inlet element and the large diameter ring gear (RingB in FIG. 2) is assigned to the outlet element. The planetary gear ratio is defined as a ratio, with respect to one complete rotation of the large diameter ring gear, of rotating speeds of the remaining rotating elements, that are the small diameter ring gear (RingA in FIG. 2), the large diameter sun gear (SunA in FIG. 2) and the small diameter sun gear (SunA in FIG. 2), respectively. The planetary gear ratio of the large diameter ring gear is 1. The planetary gear ratio of the small diameter ring gear expressed by Rsr, the planetary gear ratio Rls of the large diameter sun gear, the planetary gear ratio Rss of the small diameter sun gear expressed and the planetary gear ratio Rp of the pinion gear are obtained by the following equations, respectively.

$$Rsr = \frac{Zsp \times Z1r}{Zsr \times Z1p}$$

$$Rls = \frac{Zsp \times Z1r}{Z1s \times Z1p}$$

$$Rss = \frac{Z1r}{Zss}$$

$$Rp = \frac{Z1r}{Z1p}$$

In the above equations:
Zss: Number of teeth of small diameter sun gear
Zls: Number of teeth of large diameter sun gear
Zsp: Number of teeth of small diameter pinion
Zlp: Number of teeth of large diameter pinion
Zsr: Number of teeth of small diameter ring gear
Zlr: Number of teeth of large diameter ring gear In FIG. 2, the origin of the ordinate corresponds to rotational speed of zero of the carrier and the ordinate indicates, with respect to the rotating speed of the carrier as a reference, ratios of the rotating speed of the remaining rotating elements. Furthermore, V is referred herein below as a velocity line, which is a straight line connecting the point where the rotational speed of the large diameter ring gear is equal to 1, of which the planetary gear ratio is equal to 1 with the origin point where the planetary gear ratio of the carrier is equal to zero, on which velocity line V rotational speeds of remaining elements are respectively located, that are the small diameter sun gear, the large diameter sun gear and the small diameter ring gear. The velocity line V also indicates relationships between the rotating elements during an occurrence of the rotational fluctuation. Furthermore, the degree of the rotational fluctuation is proportional to the inclination of the velocity line V. Namely, larger the degree of the rotational fluctuation, larger is the inclination of the velocity line as illustrated by a dotted line V', resulting in changes in rotating speeds at the values of the planetary gear ratio of the respective rotating elements. Further, no existence of any rotational fluctuation causes the velocity line V to coincide with the abscissa, resulting in the same rotational speed between the five rotating elements. A change in the rotational speed of the rotational speed of the carrier from the speed of zero, the velocity line is merely moved in parallel along with the ordinate axis while a relationship of the relative rotating speeds between the rotating elements is maintained unchanged. As explained above, FIG. 2 shows the velocity chart of the damper system having five elements when the carrier at the input side is located at the origin and when the large ring gear located at the output side has a gear ratio equal to 1. As will be fully explained below, in actual practices of the present invention, from the five elements constructing the Ravigneau type planetary gear device, a desired selection of minimum three rotating elements including essentially the carrier are done for constructing desired planetary dampers. In such cases, velocity charts can be obtained in the similar idea as that in FIG. 2 and are utilized for the optimized constructions of the planetary dampers including settings of desired numbers of teeth of the rotating gear elements, as will be explained later. It should be noted that the ordinate axis of FIG. 2 indicates, with respect to the carrier as the referenced rotating element, displacements of the remaining rotating elements referred herein below as rotating displacements (angular displacement). A rotating speed may be, of course, expressed based not only on a rotating number (rpm) but also on a rotating angle (radian/sec). In velocity diagrams as will be explained later, the rotating displacement is explained by the rotating angle θ for obtaining an uniformity with equations of motion as explained later by differential equations (1) and (2). Finally, a rotating deviation of the pinions PiniA and PiniB, which are rotatably supported on the carrier while rotating about respective own axes, is also located on the velocity line V at the largest positive value side of the planetary gear ratio as shown in FIG. 2, when all of five rotating elements of Ravigneau type planetary gear device are used.

As explained in FIG. 1, the Ravigneau type planetary gear device can have the maximum 5 rotating elements, that are the ring gears RingA and RingB and the sun gears SunA and SunB and the carrier Carr, on one hand and, on the other hand, the planetary damper apparatus necessitates minimum three rotating elements for functioning as an inlet rotating element, an outlet rotating element and a damper mass, respectively. Furthermore, in the five rotating elements of the ring gears RingA and RingB and the sun gears SunA and SunB and the carrier Carr, a requirement exists that the carrier Carr must be assigned to one of the inlet element, the outlet element and the mass elements. This means that twenty combinations are possible between the inlet element and the outlet elements and, by considering selection of the damper mass, totally sixty combination are possible as illustrated in FIG. 3. In addition, a wide range selection of rotating elements for allocating desired respective functions is obtained, resulting in an increased degree of the freedom of the layout. In contrast, in the conventional planetary gear device, the elements, that are a sun gear, ring gear the carrier are allocated to the inlet element, the outlet element and the damper mass and only six combinations are therefore possible as illustrated in FIG. 4. An advantage of the wide range of selection of the combination of the Ravigneau type planetary gear device according to the present invention is clear over the prior art. Embodiments of the dynamic damper provided with the Ravigneau type planetary gear device according to the present invention will now be explained.

First Embodiment of the Present Invention

Figure 5:
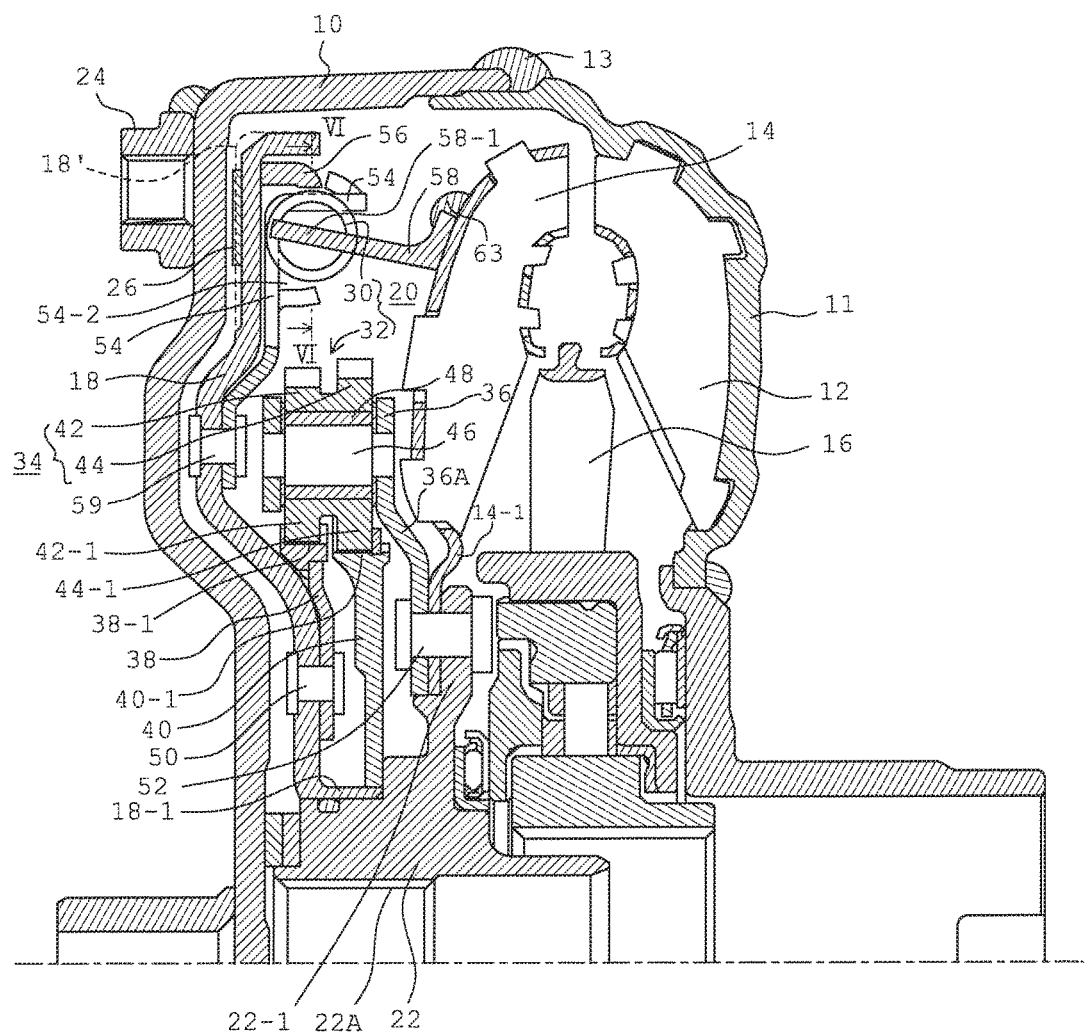
FIG. 5 is a cross sectional view of torque converter provided with a dynamic damper having Ravigneau type planetary gear device in a first embodiment of the present invention.

FIG. 5 illustrates across sectional view taken along an axial plane of a torque converter in the first embodiment of the present invention. A reference numeral 10 denotes a housing, to which an impeller shell 11 is fixed by welding. The welded portion is illustrated by a reference numeral 13. The housing 10 and impeller shell 11 form a closed space, in which a pump impeller 12, turbine blades 14 and stators 16 as essential construction parts of the torque converter are stored together with a piston plate 18 and a dynamic damper 20 in the present invention. At the center of the space closed by the housing 10 and the impeller shell 11, a hub 22 is arranged. Boss nuts 24 are fixed by the welding on the outer surface of the housing 10 on the side of an engine body. A drive plate (not shown) connected to the crankshaft of the engine is connected to the boss nuts 24 by bolts (not shown), so that the housing 10 rotates integrally with the crankshaft.

The piston plate 18 has a central boss 18-1, which is axially slidably to the hub 22 and has, at the outer part, a annular friction member (clutch facing) 26 located on a surface faced with the inner wall surface of the housing 10. A construction of the friction member 26 on the inner wall surface of the housing 10 corresponds to the lock up clutch L/C in FIG. 1. In non-lock up operation where the friction member 26 is detached from the inner wall surface of the housing 10, a power transmission using the operating oil by the torque converter is effected. Namely, the rotating movement of the crankshaft of the engine is, via the housing 10, transmitted to the impeller shell 11, the rotating movement of which impeller shell 11 generates a flow of the operating oil, which flow of the operating oil is directed to the impel shell 11. A flow of the operating oil generated by the rotating movement of the pump impellers 12 is directed to the turbine blades 14 and is again re-circulated to the pump impellers 12. Such a re-circulation of the operating oil generates a rotating movement of the turbine blades 14, so that a rotating movement of an inlet shaft (not shown) of the transmission device is obtained, which inlet shaft is in a spline (22A) engagement with the hub 22. In a lock up condition, a high oil pressure on the side of piston plate 18 remote from the clutch facing 26 causes a slide movement of the piston plate 18 to be generated at the boss portion 18-1 thereof, so that the piston plate 18 is moved in the left as shown by dotted lines 18' in FIG. 5, resulting in a press contact of the clutch facing 26 to the opposed inner wall surface of the housing 10. As a result, the rotating movement of the housing 10 is, via the piston plate 18 and the dynamic damper 20, transmitted to the hub 22, so that a direct or mechanical transmission of a rotating movement of the engine to the not shown inlet shaft of the transmission device, which is in spline (22A) engagement with the hub 22, is obtained. In this case, the torque converter does not participate in the hydraulic power transmission. In addition, the dynamic damper 20 functions to control the rotational fluctuation during the lock up operation.

A dynamic damper 20 in the first embodiment of the present invention will now be explained. The dynamic damper 20 has, as the essential construction, damper springs (resilient members) 30 and a planetary gear device 32. The idea that the planetary gear device 32 is a constituent of the dynamic damper is the same as the patent documents 1 to 5. Throughout the first embodiment as well as other embodiment, the most important feature of the present invention is in that the planetary gear device 32 is constructed as so-called Ravigneau type planetary gear device. Namely, in the first embodiment, the planetary gear device 32 is constructed by a plurality of circumferentially spaced planetary gears 34 (P/G in FIG. 1), a carrier 36 (Carr in FIG. 1), on which the planetary gears 34 are rotatably connected, a large diameter sun gear 38 (SunA in FIG. 1) and a small diameter sun gear 40 (SunB in FIG. 1). Parts corresponding to the Ring gears RingA and RingB in FIG. 1 are omitted in this embodiment. The planetary gear 34 is of a double pinion type having a stepped cross sectional shape and is formed with a small diameter pinion 42 (PiniA in FIG. 1) of a small number of teeth and a large diameter pinion 44 (PiniB in FIG. 1) of a large number of teeth, which pinions 42 and 44 are arranged axially juxtaposed so as to be rotated integrally and are integrally formed in this embodiment. Each of the planetary gears 34 is rotatably connected to the carrier 36 by means of a pinion pin 46 and a needle bearing 48. The small diameter pinion 42 meshes, at its toothed portions 42-1, with the large diameter sun gear 38 at its outer peripheral toothed portions 38-1 and the large diameter pinion 44 meshes, at its toothed portions 44-1, with the small diameter sun gear 40 at its outer peripheral toothed portions 40-1. In this embodiment, the large diameter sun gear 38 functions as the input sided rotating element, the carrier 36 functions as the output sided rotating element and the small diameter sun gear 40 functions as the damper mass. The large diameter sun gear 38 as the input sided rotating member is connected to the piston plate 28 by rivets 50. The carrier 36 as the output sided rotating element is, at its inner peripheral part 36', fixedly connected to a flange part 22-1 of the hub 22 together with a turbine liner 14-1 by rivets 52. Finally, the small diameter sun gear 40 as the damper mass extends radially inwardly so as to be located adjacent to a central boss portion 18-1 of the piston plate 18 in a manner that the small diameter sun gear 40 functions as a freely rotatable element with respect not only to the inlet element but also to the outlet element.

Figure 6:
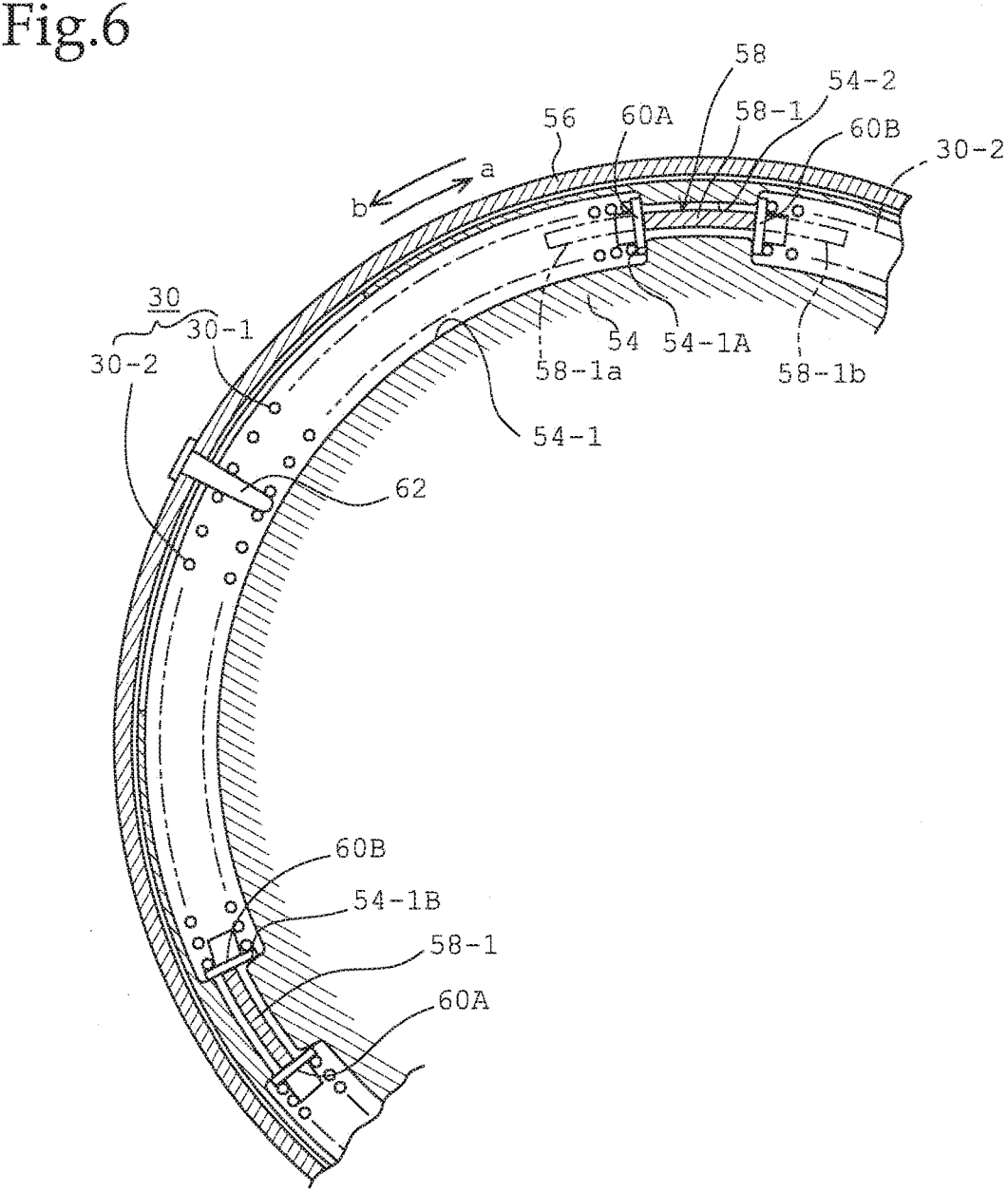
FIG. 6 shows a positional relationship between a drive plate, a driven plate, an equalizer plate and damper springs in FIG. 5 and is a cross-sectional view taken substantially along lines VI-VI in FIG. 5.

An arrangement of the damper spring 30 and a holder device thereof as well as for power (torque) transmission between the inlet and output sides (parts) by the damper spring 30 will now be explained. This arrangement is, from the view of the principle, the same as that disclosed in Non-Examined Japanese Patent Publication No. 2013-87827, of which one of applicants is the same as that of this patent application and is constructed by a drive plate or hold plate 54, an equalizer plate 56 and a driven plate 58, which are pressed products of annular shapes from steel plates. As shown in FIG. 6, each damper spring 30 is constructed by a pair of coil springs 30-1 and 30-2. The drive plate 54 is connected to the piston plate 18 by rivets 59 (FIG. 5). As shown in FIG. 6, the drive plate 54 is formed with circumferentially extending window part 54-1 for holding respective damper springs 30. The damper springs 30, each of which is constructed by the coil springs 30-1 and 30-2, are housed in the respective window part 54-1. The drive plate 54 is formed with spring engaging parts 54-1A and 54-1B at the circumferentially opposed ends of each of the window parts 54. At the opposed ends of the spring 30, each constructed by coil springs 30-1 and 30-2, spring retainers 60A and 60B are arranged in a manner that the spring retainers 60A and 60B face the opposed spring engaging parts 54-1A and 54-1B, respectively. When no relative rotating movement exists between the inlet and output sides, the spring retainers 60A and 60B contact with the opposed spring engaging parts 54-1A and 54-1B, respectively, so that a desired initial set force is generated in the damper spring 60.

The equalizer plate 56 is arranged rotatably at the location outside the drive plate 54. The equalizer plate 56 is formed with coil spring supports 61 at three locations circumferentially spaced each other of an angle of 120 degree. The coil spring support 61 extends radially inwardly between the adjacent ends of the coil springs 30-1 and 30-2 constructing the damper spring 30. A relative rotating movement between the inlet and the output sides causes one of the coil springs 30-1 and 30-2 to be deformed and this deformation causes the coil spring support 61 as well as the equalizer plate 56 to effect corresponding rotating displacement. Such a rotating displacement of the equalizer plate 56 functions to equalize deformations between the coil springs 30-1 and 30-2 with respect to the relative rotating movement between the inlet and the output sides. The driven plate 58 is fixedly welded and connected to the turbine liner 14-1 at a welded portion 63. The driven plate 58 is basically of an annular shape and is however formed with spring engaging parts 58-1 at circumferentially spaced three locations, which spring engaging parts extend axially in a direction transverse to the plane of the paper of FIG. 6 in a manner that the spring engaging parts 58-1 of the driven plate 58 extend into respective recessed parts 54-2 formed in the driven plate 58. In case of no existence of relative rotating movement between the inlet and the output sides, the spring engaging parts 58-1 of the driven plate 58 extend between the spring retainers 60A and 60B located adjacent with each other without substantial existence of clearances of the driven plate 58 (the spring engaging parts 58-1) with respect to the respective spring retainers 60A and 60B. When a relative rotating movement of the drive plate 54 at the input side to the driven plate 58 at the output side in the clockwise direction as shown by an arrow a is occurred, the spring engaging parts 58-1 of the driven plate 58 are displaced in the direction a of the rotating movement as show by phantom lines 58-1$a$, resulting in deformations of the coil springs 30-1 vie the respective spring retainers 60A. Such deformations of the coil springs cause the associated respective coil springs 30-2 to be equally deformed by way of the respective spring supporting parts 62, i.e., the equalizer plate 56. When a relative rotating movement of the drive plate 54 at the input side to the driven plate 58 at the output side in the counter clockwise direction as shown by an arrow b is occurred, the spring engaging parts 58-1 of the driven plate 58 are displaced in the direction b of the rotating movement as show by phantom lines 58-1$b$, resulting in deformations of the coil springs 30-2 via the respective spring retainers 60B. Such deformations of the coil springs cause the associated respective coil springs 30-1 to be equally deformed by way of the respective spring supporting parts 62, i.e., the equalizer plate 56. An effective control of rotational fluctuation (torque fluctuation) is obtained by the damper springs 30 (coil springs 30-1 and 30-2) subjected to deformations in accordance with relative rotating movements of the drive plate 54 at the input side to the driven plate 58 at the output side as explained above as well as the Ravigneau type planetary gear device arranged between the inlet and the output sides in accordance with the present invention, as will be fully explained later.

Figure 7:
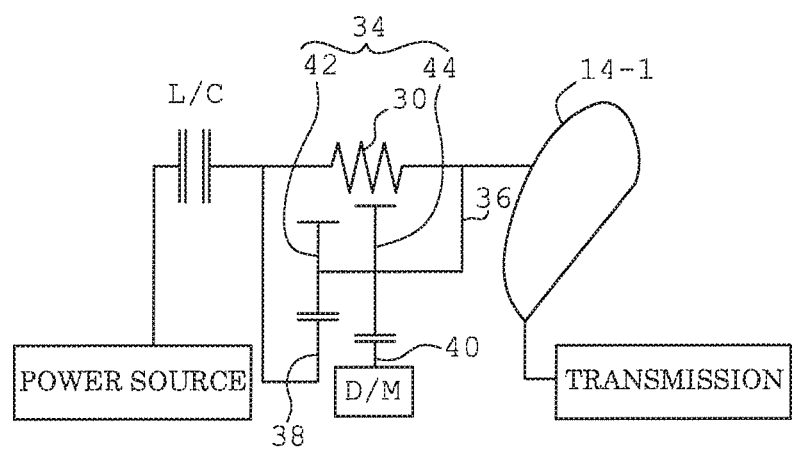
FIG. 7 shows a schematic diagrammatic view of a power transmission system from an engine to a transmission, which system is provided with a dynamic damper according to the first embodiment of the present invention shown in FIG. 5.

FIG. 7 illustrates schematically a power (torque) transmission system in the first embodiment, in which, in the Ravigneau type planetary gear device, the small diameter pinions 42 of the planetary gears 34 mesh with the large diameter sun gear 38 and the large diameter pinions 44 of the planetary gears 34 mesh with the small diameter sun gear 40. The damper springs 30 are located between the large diameter sun gear 38 and the carrier 36. In the embodiment, Ravigneau type planetary gear device 32 is constructed by the minimum three rotating elements. The large diameter sun gear 38 as the first rotating element is located at the input side and is connected to the power source when the lock up clutch L/C is engaged, i.e., when a movement of the piston plate 18 is obtained for an engagement of the friction member 26 with the opposite surface of the housing 10 as shown by the dotted lines 18' in FIG. 5. The carrier 36 as the second rotating element is located at the output side and is connected to the transmission side, i.e., the hub 22. The small diameter sun gear 40 as the remaining third rotating element of the Ravigneau type planetary gear device 32 does not participate in a torque transmission from the power source to the transmission and rotates freely, so that the small diameter sun gear 40 functions as the damper mass D/M. This first embodiment is advantageous in that no use of any ring gear of large diameter as well as of heavy weight can provide an increased usable space in the housing 10 in radial direction, on one hand and, on the other hand, can provide a possibility in reducing a weight of the entire system.

Second Embodiment of the Present Invention

Figure 8:
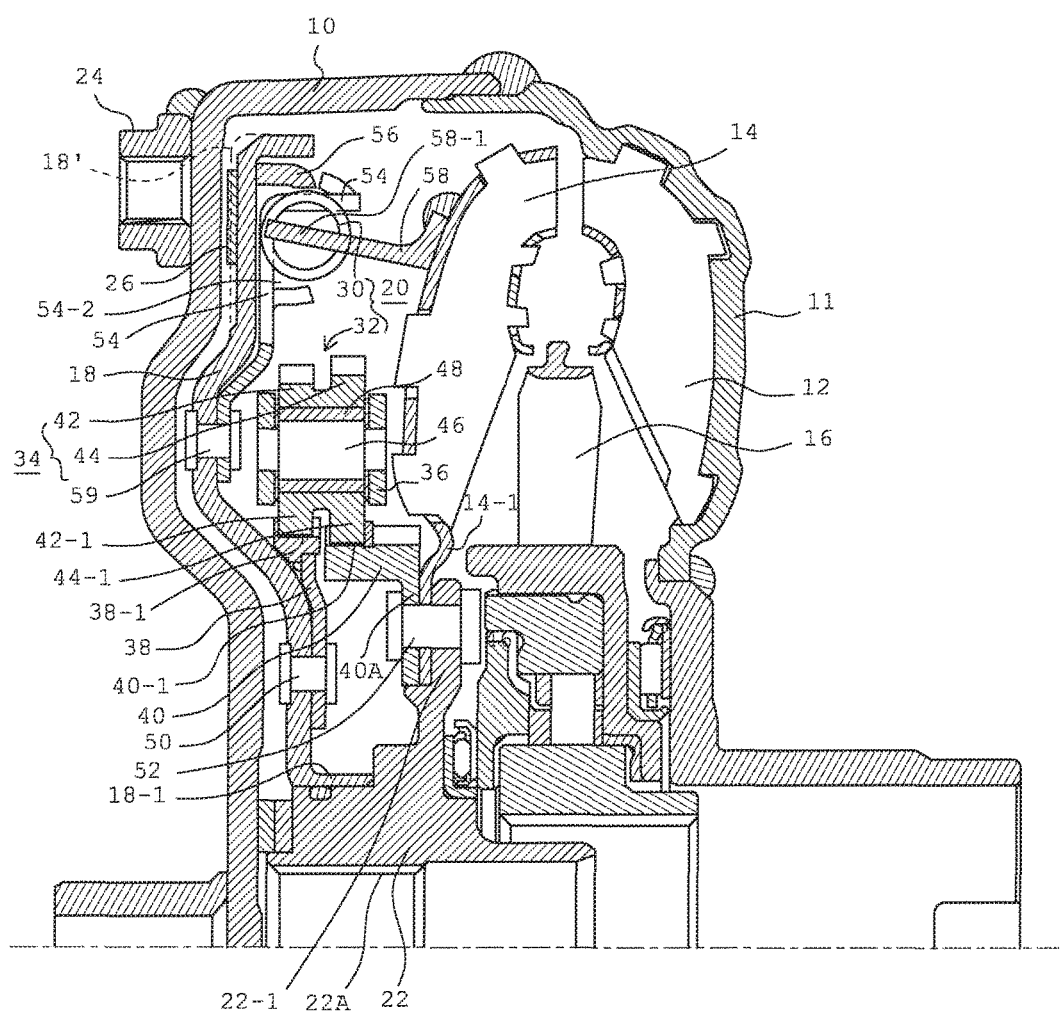
FIG. 8 is a cross sectional view of torque converter provided with a dynamic damper having Ravigneau type planetary gear device in a second embodiment of the present invention.

FIG. 8 shows a dynamic damper in second embodiment, wherein the Ravigneau type planetary gear device 32 includes a plurality of circumferentially spaced planetary gears 34 (P/G in FIG. 1), a carrier 36 (Carr in FIG. 1), on which the planetary gears 34 are rotatably supported, a large diameter sun gear 38 (SunA in FIG. 1) and a small diameter sun gear 40 (SunB in FIG. 1) and parts corresponding to the two ring gears RinA and RinB are omitted as similar to the first embodiment. A construction is the same with that in the first embodiment in that each of the planetary gears 34 is rotatable with respect to the carrier 36 by means of the pinion pin 46 and the needle bearing 48, in that the small diameter pinions 42 mesh, at the toothed portions 42-1 thereof, with the large diameter sun gear 38 at its outer peripheral toothed portions 38-1 thereof and in that the large diameter pinions 44 mesh, at the toothed portions 44-1 thereof, with the small diameter sun gear 40 at the outer peripheral toothed portions 40-1 thereof. Furthermore, the large diameter sun gear 38 in this second embodiment functions also as the input sided rotating element as similar to the first embodiment. A first difference over the first embodiment is that the small diameter sun gear 40 meshing with the large diameter pinions 44 is, at an inner peripheral part 40A thereof, fixedly connected to a flange part 22-1 of the hub 22 together with the turbine liner 14-1 by rivets 52 in a manner that the small diameter sun gear 40 functions as the output side rotating member. A second difference is that the carrier 36 is made to be a freely rotating element functioning as the damper mass.

Figure 9:
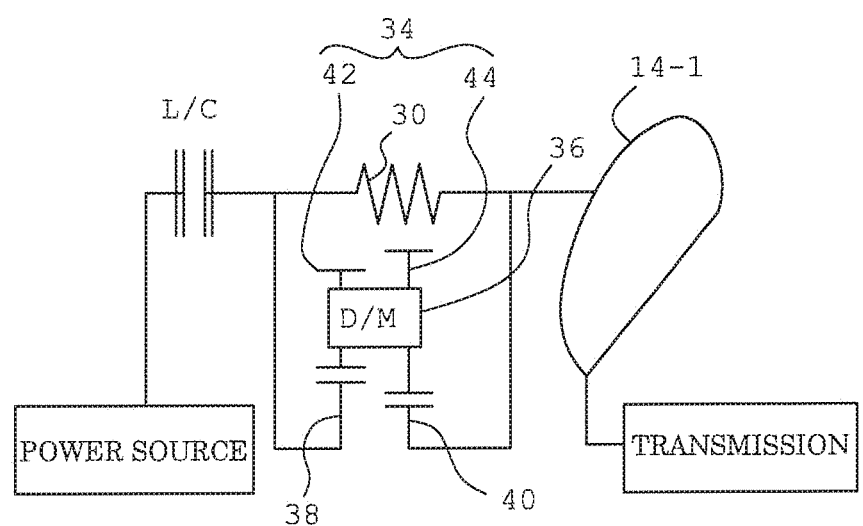
FIG. 9 shows a schematic diagrammatic view of a power transmission system from an engine to a transmission according to the second embodiment of the present invention shown in FIG. 8.

A construction for supporting the damper springs 30 by means of the drive plate 54, the eqlulizer plate 56 and the driven plate 58 and a function for absorbing the power or torque fluctuation in the second embodiment in FIG. 8 are similar to those explained with reference to FIG. 6 in the first embodiment in that, as explained with reference to FIG. 6, each of the damper springs 30 in FIG. 8 is of a divided type, which is constructed by a pair of coil springs corresponding to the parts 30-1 and 30-2 in FIG. 6, in that the damper springs 30 are supported by the drive plate 54 in a manner that an initial set force is generated in a condition of no relative rotating movement between the input and the output parts, in that an occurrence of a relative rotating movement between the input and the output parts causes a compression of the damper springs 30 to occur between the drive plate 54 and the driven plate 58 in the direction of the relative rotating movement for reducing the rotational fluctuation and in that a rotating movement of the equalizer plate 56 is occurred in accordance with the degree of the rotational fluctuation as explained with reference to FIG. 6 for equalizing degrees of deformation between the coil springs corresponding to the parts 30-1 an 30-2 in FIG. 6. FIG. 9 illustrates schematically a power (torque) transmission system in the second embodiment, in which, in the Ravigneau type planetary gear device, the small diameter pinions 42 of the planetary gears 34 mesh with the large diameter sun gear 38 and the large diameter pinions 44 of the planetary gears 34 mesh with the small diameter sun gear 40. The damper springs 30 are located between the large diameter sun gear 38 and the small diameter sun gear 40. In the embodiment, the Ravigneau type planetary gear device 32 is constructed by the minimum three rotating elements. The large diameter sun gear as the first rotating element becomes the inlet part, which inlet part is connected to the power source when the lock up clutch L/C is engaged, i.e., when a movement of the piston plate 18 is obtained for an engagement of the friction member 26 with the opposite surface of the housing 10 as shown by the dotted lines 18' in FIG. 8. The small diameter sun gear 40 as the second rotating element is located at the output part and is connected to the transmission sided part (the hub 22) by way of turbine liner 14-1. The carrier 36 as the remaining third rotating element of the Ravigneau type planetary gear device 32 does not take part in a torque transmission from the power source to the transmission and rotates freely, so that the carrier 36 functions as the damper mass D/M. As similar to the first embodiment, the construction of the second embodiment is advantageous in that no use of any ring gear of large diameter can provide an increased usable space in the housing 10 in radial direction and is also advantageous from the viewpoint of possibility of reduction of the weight of the device. In addition, the carrier 36 functioning as the damper mass D/M is located at a radially relatively outside location, which is effective for obtaining an increased value of the inertia of the damper mass.

Third Embodiment of the Present Invention

FIG. 10 shows a dynamic damper in a third embodiment, wherein the Ravigneau type planetary gear device 32 includes a plurality of circumferentially spaced planetary gears 34 (P/G in FIG. 1), a carrier 36 (Carr in FIG. 1), on which the planetary gears 34 are rotatably supported, a small diameter ring gear 64 (RingA in FIG. 1) and a large diameter ring gear 66 (RingB in FIG. 1). A construction for rotatably supporting the planetary gears 34 to the carrier 36 by means of the pinion pins 46 and the needle bearings 48 is the same as that in the first embodiment in FIG. 5. The small diameter pinions 42 mesh, at the outer peripheral toothed portions 42-1 thereof, with the small diameter ring gear 64 at the inner peripheral toothed portions 64-1 thereof and the large diameter pinions 44 mesh, at the toothed portions 44-1 thereof, with the large diameter ring gear 66 at the inner peripheral toothed portions 66-1 thereof. In this third embodiment, the parts corresponding to the large sun gear SunA and the small sun gear SunB shown in FIG. 1 are omitted. The small ring gear 64 becomes to be a rotating element on the input side, the carrier 36 a rotating element at the output side and the large diameter ring gear 66 a damper mass. Namely, the small diameter ring gear 64 as the rotating element on the input side is connected, by welding (68), to the drive plate 54, which is connected to the piston plate 18 by rivets 59 as similar to the first embodiment (FIG. 5), so that the rotating movement from the drive source is receipt by the small diameter ring gear 64. The carrier 36 as the rotating element located at the output side is connected for an integrated rotation with the driven plate 58, which is fixed by welding (63) to the turbine liner 14-1 as similar to the first embodiment shown in FIG. 5. This integrated rotating movement between the carrier 36 and the turbine liner 14-1 in this embodiment is obtained by a construction that the carrier 36 is, at the outer periphery thereof, formed with equiangularly spaced toothed portions 36-1, which are engaged with equiangularly spaced grooves 58-1 of the driven plate 58. Finally, the large ring gear 66 as the third rotating element does not take part in any torque transmission from the power source to the transmission and rotates freely to function as the damper mass.

A construction for supporting the damper springs 30 by means of the drive plate 54, the eqlulizer plate 56 and the driven plate 58 and a function for absorbing the power (torque) fluctuation in the third embodiment in FIG. 10 are similar to those explained with reference to FIG. 6 in the first embodiment. First, as explained with reference to FIG. 6, each of the damper springs 30 in FIG. 10 is of a divided type, which is constructed by a pair of coil springs corresponding to the parts 30-1 and 30-2 in FIG. 6. Second, the damper springs 30 are supported by the drive plate 54 in a manner that an initial set force is generated in a condition of no relative rotating movement between the input side and the output side. Third, an occurrence of a relative rotating movement between the input side and the output side causes a compression of the damper springs 30 to occur between the drive plate 54 and the driven plate 58 in the direction of the relative rotating movement for reducing the rotational fluctuation. Finally, a rotating movement of the equalizer plate 56 is occurred in accordance with the degree of the rotational fluctuation as explained with reference to FIG. 6 for equalizing degrees of deformation between the coil springs corresponding to the parts 30-1 an 30-2 in FIG. 6.

In the third embodiment, the drive plate 54 is a two-part structure including an auxiliary plate 70 connected by rivets 72. The equalizer plate 56 is located at the inner peripheral side of the damper springs 30 and has a radially inwardly extended part located in a space between the small diameter ring gear 64 and the large diameter ring gear 66 and a supporting part of divided springs corresponding to the coil springs 30-1 and 30-2 in FIG. 6. Furthermore, a different shape of the driven plate 58 is used but is constructed to obtain the same function as explained with reference to the first embodiment as explained in FIG. 6. In short, a detailed construction of the drive plate 54, the equalizer plate 56 and the driven plate 58 do not matter the essence of the present invention and thus the detailed explanation thereof is omitted.

Figure 11:
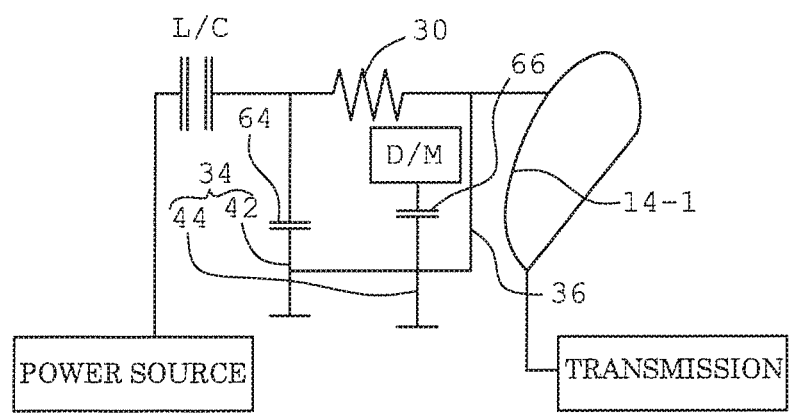
FIG. 11 shows a schematic diagrammatic view of a power transmission system from an engine to a transmission according to the third embodiment of the present invention shown in FIG. 10.

FIG. 11 illustrates schematically a power (torque) transmission system in the third embodiment, in which, in the Ravigneau type planetary gear device, the small diameter pinions 42 of the planetary gears 34 mesh with the small diameter ring gear 64 and the large diameter pinions 44 of the planetary gears 34 mesh with the large diameter ring gear 66. The damper springs 30 are located between the small diameter ring gear 64 and the carrier 36. In the embodiment, the Ravigneau type planetary gear device 32 is constructed by the minimum three rotating elements. The small diameter ring gear 64 as the first rotating element is located at the input side and is connected to the power source when the lock up clutch L/C is engaged, i.e., when a movement of the piston plate 18 is obtained for an engagement of the friction member 26 with the opposite surface of the housing 10 as shown by the dotted lines 18' in FIG. 10. The carrier 36 as the second rotating element is located at the output side and is connected to the transmission sided part (the hub 22) by way of turbine liner 14-1. The large diameter ring gear 66 as the remaining third rotating element of the Ravigneau type planetary gear device 32 does not take part in a torque transmission from the power source to the transmission and rotates freely, so that the large diameter ring gear 66 functions as the damper mass D/M. As similar to the first embodiment, the second embodiment is advantageous in that no use of any sun gear can provide an increased usable space in the housing 10 in radial direction and is also advantageous from the viewpoint of possibility of reduction of the weight of the device.

Fourth Embodiment of the Present Invention

Figure 12:
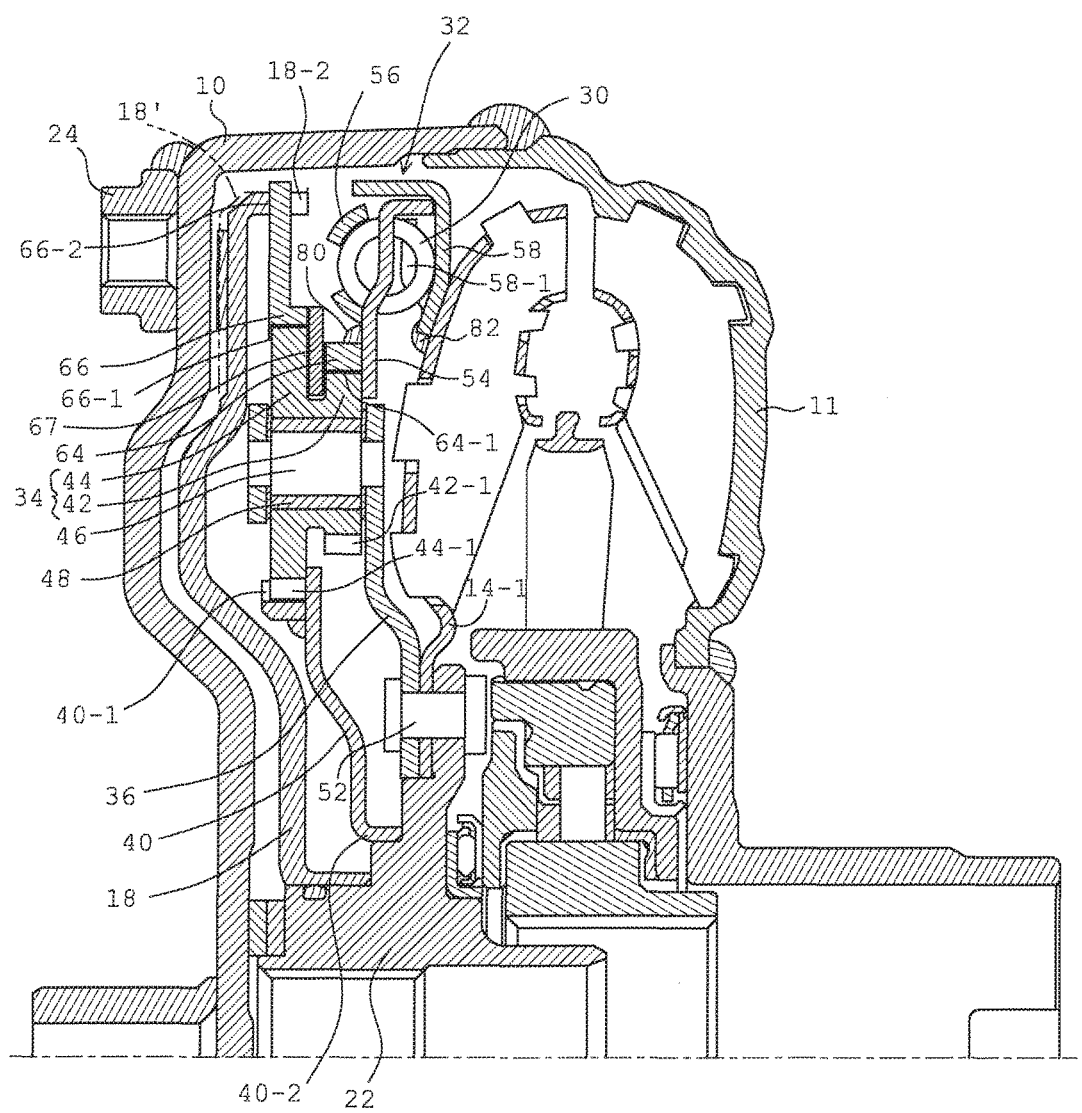
FIG. 12 is a cross sectional view of torque converter provided with a dynamic damper having Ravigneau type planetary gear device in a fourth embodiment of the present invention.

FIG. 12 shows a dynamic damper in a fourth embodiment, wherein the Ravigneau type planetary gear device 32 includes a plurality of circumferentially spaced planetary gears 34 (P/G in FIG. 1), a carrier 36 (Carr in FIG. 1), on which the planetary gears 34 are rotatably supported, a small diameter sun gear 40 depicted as the large diameter sun gear SunA in FIG. 1, a small diameter ring gear 64 depicted as the large diameter ring gear RingB in FIG. 1 and a large diameter ring gear 66 depicted as the small diameter ring gear RingA in FIG. 1. A positional relationship between the small diameter pinions 42 and the large diameter pinions 44 is axially reversed in comparison with those in the first to third embodiments (FIGS. 5, 8 and 10). A structure for rotatably supporting the planetary gears 34 to the carrier 36 by means of the pinion pins 46 and the needle bearings 48 are the same as that in the first embodiment shown in FIG. 5. The large diameter pinions 44 mesh, at the outer peripheral toothed portions 44-1 thereof, with the large diameter ring gear 66 at the inner peripheral toothed portions 66-1 thereof and with the small diameter sun gear 40 at the outer peripheral toothed portions 40-1. The small diameter pinions 42 mesh, at the outer peripheral toothed portions 42-1 thereof, with the small diameter ring gear 64 at the inner peripheral toothed portions 64-1 thereof. The Ravigneau type planetary gear device 32 of this fourth embodiment differs from the fully geared Ravigneau type planetary gear device in FIG. 1 only in that the part corresponding the sun gear SunB as depicted as the small diameter ring gear is omitted. The large diameter ring gear 66 becomes to be a rotating element on the input side, the carrier 36 a rotating element at the output side and the small diameter sun gear 40 a damper mass. Namely, the large diameter ring gear 66 as the rotating element on the input side has, at the outer periphery, toothed portions 66-2, which engage with grooves 18-2 at the outer periphery of the piston plate 18, so that the large diameter ring gear 66 can receive a rotating movement from the power source when the lock up operation is carried out. An annular plate 67 for holding the large diameter ring gear 66 is formed with a radially inwardly extended part located in the space between the pinions 42 and 44. The carrier 36 as the rotating element located at the output side is connected to the hub 22 together with the turbine liner by the rivets 52 and is connected to the transmission as similar to the first embodiment in FIG. 5. The small diameter sun gear 40 has outer peripheral toothed portions 40-1 meshing with the large diameter pinions 44 and extends inwardly so as to form a boss portion 40-2, which is rotatable with respect to the hub 22. Thanks to this construction, the small diameter sun gear 40 does not take part in any torque transmission from the power source to the transmission and rotates freely to function as the damper mass.

The damper springs 30 in this embodiment are located between the carrier 36 as a rotating component at the output side and the small diameter ring gear 64 and the manner of the arrangement of the damper springs 30 is similar to those described with reference to the first embodiment by referring to FIG. 6. Namely, as explained with reference to FIG. 6, the damper springs 30 are of divided type, each constructed by a pair of coil springs corresponding to the coil springs 30-1 and 30-2 in FIG. 6, the damper springs 30 are supported by the drive plate 54 so that initial set forces are generated in the respective springs when no relative rotating displacement exits between the inlet and the output sides. The drive plate 54 is connected to the small diameter ring gear 64 by welding at welds 80. A generation of a relative rotating displacement between the drive plate 54 and the driven plate 58 fixed to the turbine liner 14-1 at welds 82 causes the damper springs to be subjected to elastic shrinkage in the direction of the rotating displacement, so that a reduction of the rotational fluctuation is obtained. The driven plate 58 is formed with spring support parts 58-1 extending between spring retainers corresponding to the parts 60A and 60B shown in FIG. 6, so that a rotational fluctuation causes the damper springs 30 to be subjected to the deformations via the spring retainers (60A and 60B), resulting in a reduction of the rotational fluctuation. Finally, the equalizer plate 56 effects a rotating movement in accordance with the rotational fluctuation in the same principle as explained with reference to FIG. 6, resulting in an equalization of the amounts of deformation of the coil springs as explained with regard to the coil springs 30-1 and 30-2 in FIG. 6.

Figure 13:
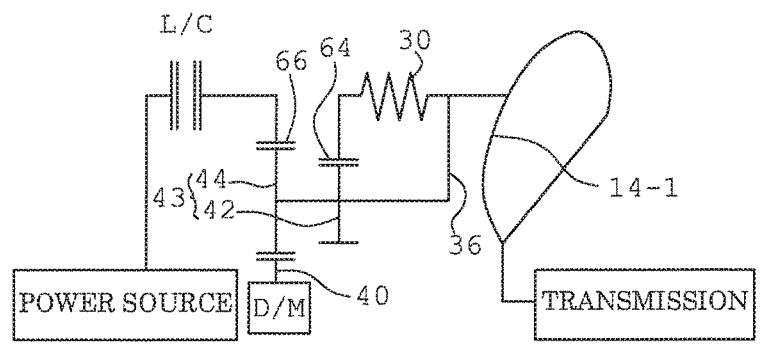
FIG. 13 shows a schematic diagrammatic view of a power transmission system from an engine to a transmission according to the fourth embodiment of the present invention shown in FIG. 12.

FIG. 13 illustrates schematically a power (torque) transmission system in the fourth embodiment, in which, in the Ravigneau type planetary gear device, the small diameter pinions 42 of the planetary gears 34 mesh with the small diameter ring gear 64 and the large diameter pinions 44 of the planetary gears 34 mesh with the large diameter ring gear 66. In the embodiment, the Ravigneau type planetary gear device 32 is constructed by four rotating elements. The large diameter ring gear 66 as the first rotating element is located at the input side and is connected to the power source when the lock up clutch L/C is engaged. The carrier 36 as the second rotating element is located at the output side and is connected to the part on the transmission side (the hub 22) by way of turbine liner 14-1. The damper springs 30 are located between the small ring gear 64 and the carrier 36 as the part located at the output side. The small diameter ring gear 40 as the remaining fourth rotating element of the Ravigneau type planetary gear device 32 does not take part in a torque transmission from the power source to the transmission and rotates freely, so that the small diameter ring gear 40 functions as the damper mass D/M.

In comparison with the first, the second and the third embodiments, in which only three essential rotating elements from the five rotating elements of the Ravigneau type planetary gear device are used, that are the rotating elements located at the inlet and output sides and the rotating element functioning as a damper mass, the fourth embodiment is different from the first, the second and the third embodiments in that, as a fourth rotating element, the small diameter ring gear 64 is provided, which is connected to the output side by way of the damper springs 30. As an alternative, the fourth rotating element may be connected to the part at the input side by way of the damper springs. As a further alternative, the fourth and/or the ultimate fifth rotating element may be arranged so as to be functioning as an additional damper mass or damper masses.

Figure 14:
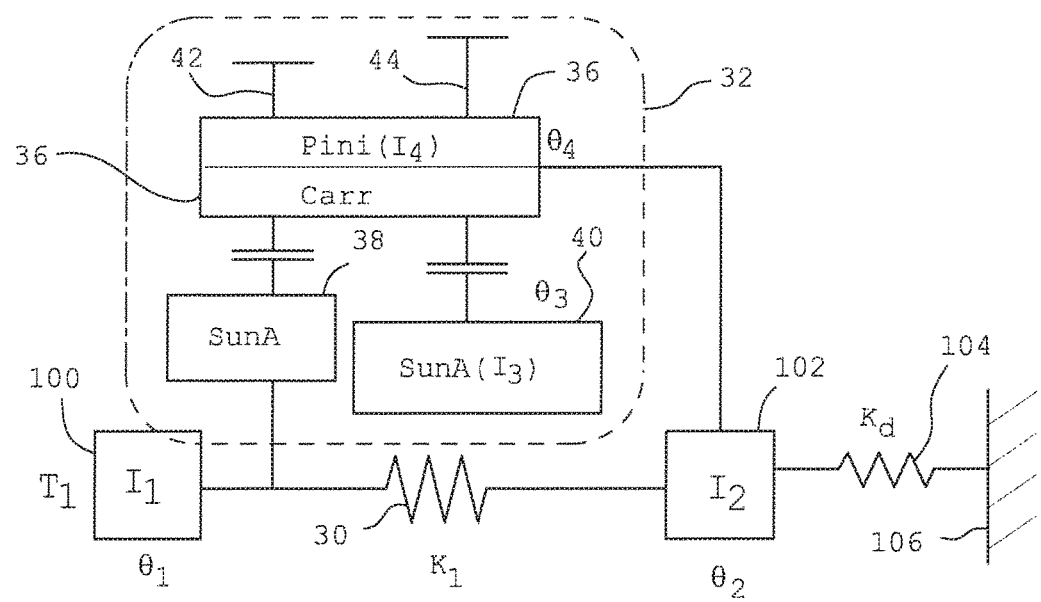
FIG. 14 is a schematic diagrammatic view illustrating a model for calculating a rotational fluctuation in the dynamic damper in the first embodiment of the present invention shown in FIGS. 5 and 7.

Examples for Calculation of Vibration Model of Planetary Damper in the Present Invention A method will now be explained as to how a calculation of rotational fluctuation of the planetary damper according to the present invention is done by referring to FIG. 14. FIG. 14 shows a model structure of the construction of the first embodiment shown in FIGS. 5 to 7 for a calculation of the rotational fluctuation. A reference numeral 100 shows totally rotating parts at the input side, which is constructed by the rotating parts from the crankshaft, via the housing 10, the impeller shell 11, the piston plate 18 and drive plate 54, to the large diameter sun gear 38. A reference numeral 102 shows totally rotating parts at the side of the transmission, which includes not only the carrier 36 including the planetary gears 34 and the pinion pins 46 but also the parts connected thereto, including the turbine blades 14, the turbine liner 14-1, the rivets 54 and the hub 22 as well as the rotating parts on the transmission following the hub 22. In the model structure for the calculation of the rotational fluctuation, the dynamic damper constructed by the Ravigneau type planetary gear device 32 and the damper springs 30 is arranged between the input side rotating part 100 and the transmission side rotating part 102 and the transmission side rotating part 102 is connected to a vehicle body 106 via a vehicle drive shaft 104. In FIG. 14, meanings of various symbols are follows.

$I_1$: Moment of inertia of input side rotating part 100 of torque converter $I_2$: Moment of inertia of transmission side rotating part 102 of torque converter $I_3$: Moment of inertia of damper mass (small diameter sun gear 40), $I_4$: Moment of inertia of pinions 42 and 44

$K_j$: Torsional rigidity of damper springs 30

$K_d$: Torsional rigidity of vehicle drive shaft $T_1$: Torque fluctuation of input side rotating part 100 of torque converter $\theta_1$: Rotating displacement of input side rotating part 100 of torque converter $\theta_2$: Rotating displacement of transmission side rotating part 102

$\theta_3$: Rotating displacement of damper mass (small diameter sun gear 40) and $\theta_4$: Rotating displacement of pinions 42 and 44 rotating about own axes In this model, following equations of motion, of which number of degree of freedom is 2, stand.

$$(I_1 + i^2 I_3 + j^2 I_4) \times \frac{d^2\theta_1}{dt^2} - \qquad (1)$$

$$(i(1+i)I_3 + j(1+j)I_4) \times \frac{d^2\theta_2}{dt^2} + K_1 \times (\theta_1 - \theta_2) = T_1 \times \sin(\varpi t)$$

-continued $$-(i(1+i)I_3 + j(1+j)I_4) \times \frac{d^2\theta_1}{dt^2} + \qquad (2)$$

$$(I_2 + (1+i)^2 I_3 + (1+j)^2 I_4) \times \frac{d^2\theta_2}{dt^2} + K_1 \times (\theta_2 - \theta_1) + K_d \times \theta_2 = 0$$

In the above equations (1) and (2), ratio i (relative rotation ratio) is a ratio of a rotating displacement between the inlet part and the outlet part, $\theta_1 - \theta_2$ to a rotating displacement between the outlet part and the damper mass, $\theta_2 - \theta_3$ and is expressed by the following equation.

$$i = \frac{\theta_2 - \theta_3}{\theta_1 - \theta_2} \qquad (3)$$

Futhermore, j (relative rotation ratio) is a ratio of a rotating displacement between the inlet part and the outlet part, $\theta_1 - \theta_2$ to a rotating displacement between the outlet part and the pinions, $\theta_2 - \theta_4$ and is expressed by the following equation.

$$j = \frac{\theta_2 - \theta_4}{\theta_1 - \theta_2} \qquad (4)$$

In the operation of the planetary gear device, the pinions 42 and 44 effect a rotating movement about the axis of the total device while being rotated about own axes, so that a rotating movement of the carrier 36 is obtained. Due to the rotating movements about own axes, the pinions 42 and 44 having a weight provide a rotating inertia mass, which causes the pinions to function as a damper mass. The pinions thus function as mass elements. In the equations (1) and (2), a consideration is taken that the pinions 42 and 44 function also as damper masses.

Figure 15:
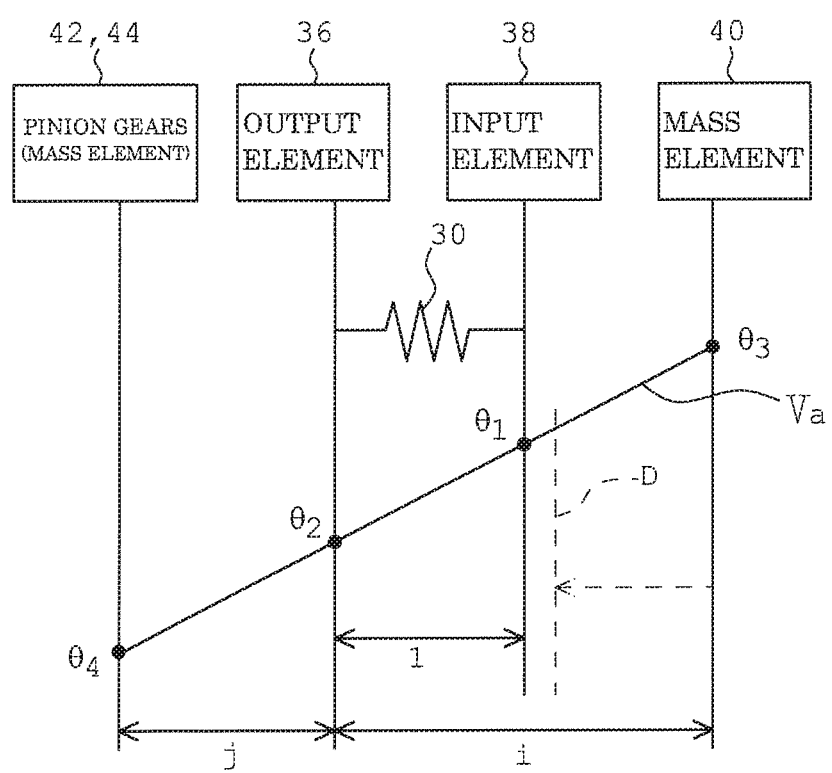
FIG. 15 is a graph showing displacements of an inlet element (large diameter sun gear), an outlet element (carrier) and a mass element (small diameter sun gear) on the velocity line, of the Ravigneau type planetary gear device according to the first embodiment shown in FIGS. 5 and 7.

FIG. 15 is a velocity chart of the first embodiment of the present invention as modeled from that shown in Figure for calculating the rotational fluctuation, in which velocity chart rotating displacements are, in the similar way as explained in detail with reference to FIG. 2, shown for the inlet component (the large diameter sun gear 38), the outlet element (the carrier 36) and the mass component (the small diameter sun gear 40) of the planetary gear device 32. Namely, a velocity line Va is shown, on which the rotational displacement $\theta_1$ of the inlet component (the large diameter sun gear 38), the rotational displacement $\theta_2$ of the outlet element (the carrier 36) and the rotational displacement $\theta_3$ of the mass component (the small diameter sun gear 40) are located, as similar to the velocity line V or V' in FIG. 2. In FIG. 15, on the abscissa indicating planetary gear ratio, the inlet element (the large diameter sun gear 38) is located intermediate between the outlet element 36 and the mass element 40 and is, therefore, referred herein below as a central element. With the value of planetary gear ratio of 1.0 between the inlet element (the large diameter sun gear 38) and the outlet element (the carrier 36), a difference of a value of planetary gear ratio of the mass element (the small diameter sun gear 40) with respect to the out element (the carrier 36) becomes, as is, a relative rotation ratio i in the above equation (3). Note: In velocity charts including not only that in FIG. 15 but also those in FIGS. 20 to 22, the outlet element, of which value of rotating displacement is $\theta_2$, is taken as the reference and the remaining inlet element and the mass element, of which values of rotating displacements are $\theta_1$ and $\theta_3$, respectively, are shown on the respective locations along the abscissa while sins thereof being taken into the consideration. Furthermore, a rotational displacement $\theta_4$ of the pinions 42 and 44, which rotate about own axes, is also located on the velocity line Va and a difference of planetary gear ratio of the pinions 42 and 44 with respect to that of the outlet element (carrier 36) becomes, as is, a relative rotation ratio j. Namely, the rotation deviation $\theta_4$ of the pinions 42 and 44 are located on the position of abscissa at a value of relative rotation ratio j from the outlet rotating element 36. Finally, the weight of the pinions 42 and 44 functions as a mass element on the carrier, on one hand and, on the other hand, the moment of inertia by their self rotating movement functions independently as a mass element at the relative rotating ratio j.

Figure 16:
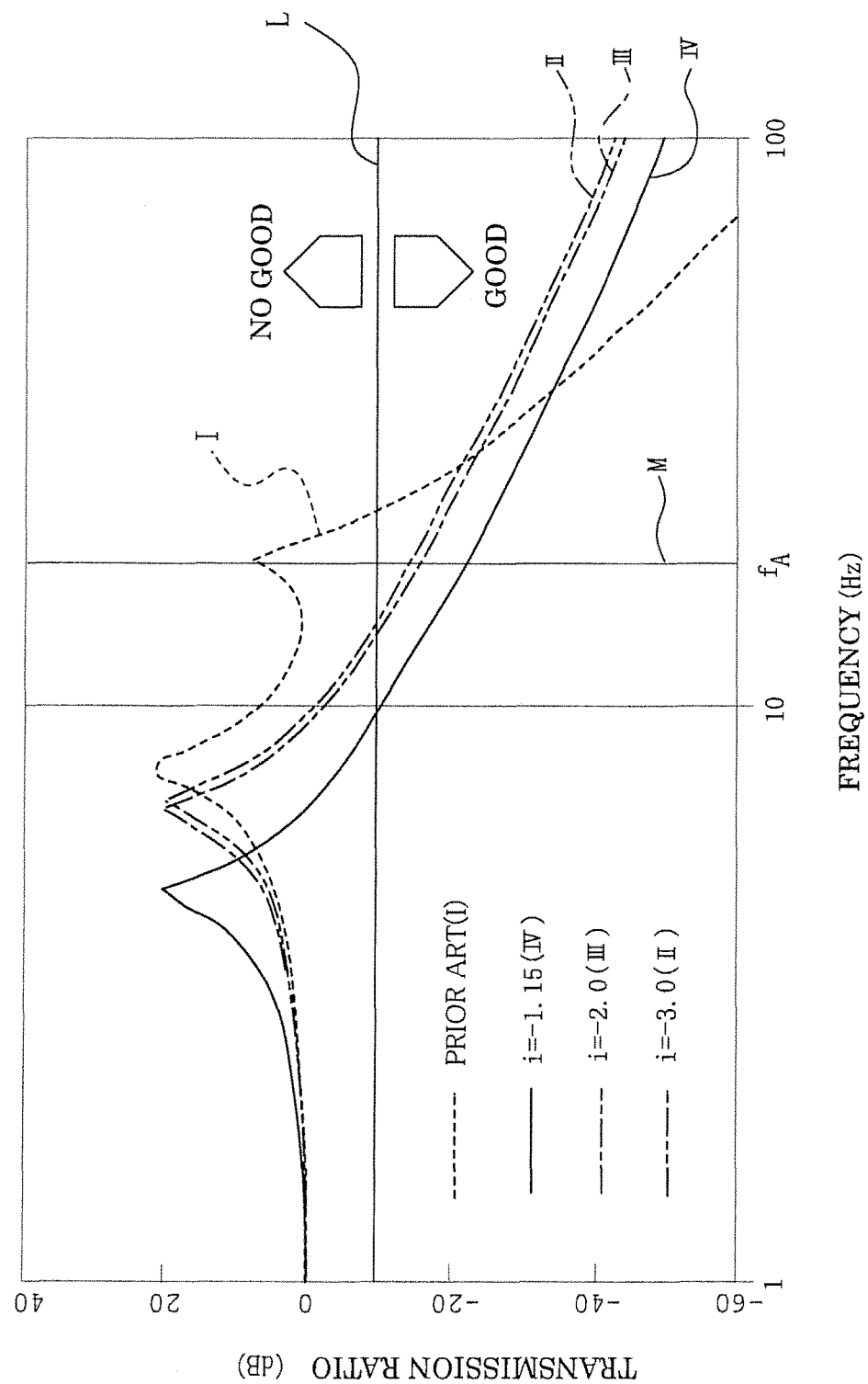
FIG. 16 shows graphs illustrating frequency characteristics of transmission rates of rotational fluctuation as calculated by the model shown in FIG. 14.

FIG. 16 illustrates calculated results of transmission rates of a torque fluctuation as obtained by executing numerical calculation as to the equations of motion (1) and (2) in comparison with the prior art damper apparatus provided only with the coil springs as in the patent document 6 shown by a curve I. In FIG. 16, a curve II shows when ratio i is equal to −3.0 (curve II), a curve III is when ratio i is equal to −2.0 and a curve IV is when ratio i is equal to −1.15. Note: Abscissa is frequency. The transmission rate is defined as a ratio of the torque fluctuation at the output side to the torque fluctuation at the input side. This definition means that the smaller a value of the transmission rate, the smaller is the torque fluctuation appeared at the output side, resulting in a reduction in the torque fluctuation. Any of these values of the relative rotation ratio i, peaks in the values of transmission rate are appeared at values of frequency smaller than 10 Hz under the effect of resonance and a characteristic is clear that the higher the frequency the smaller is the transmission rate at the region of the frequency higher than the frequencies at the respective peaks. In FIG. 16, a line L shows a permissible upper limit of the torque fluctuation, a value of which upper limit is, for example, −10 dB. When a transmission rate of torque fluctuation at a frequency $f_4$ of about 25 Hz shown by a line M is focused, which is considered important in recent trends vehicles of low noise, it is clear that the present invention shown in the curves II to IV can prevent any peak from being generated at this frequency area, which otherwise is generated in the prior art as shown in the curve I. In addition, it is understood from this results that an effective reduction of the transmission rate from the permissible upper level (line L) is obtained when a value of the planetary gear ratio i is closer to a value of −1. Furthermore, it is also understood from the results that an increase in the value of the planetary gear ratio i in a minus direction, like i=−2 and i=−3, can still maintain the transmission rate below the permissible upper limit (line L) and is however not desirable because the value of the transmission approaches the permissible upper limit (line L).

Figure 17:
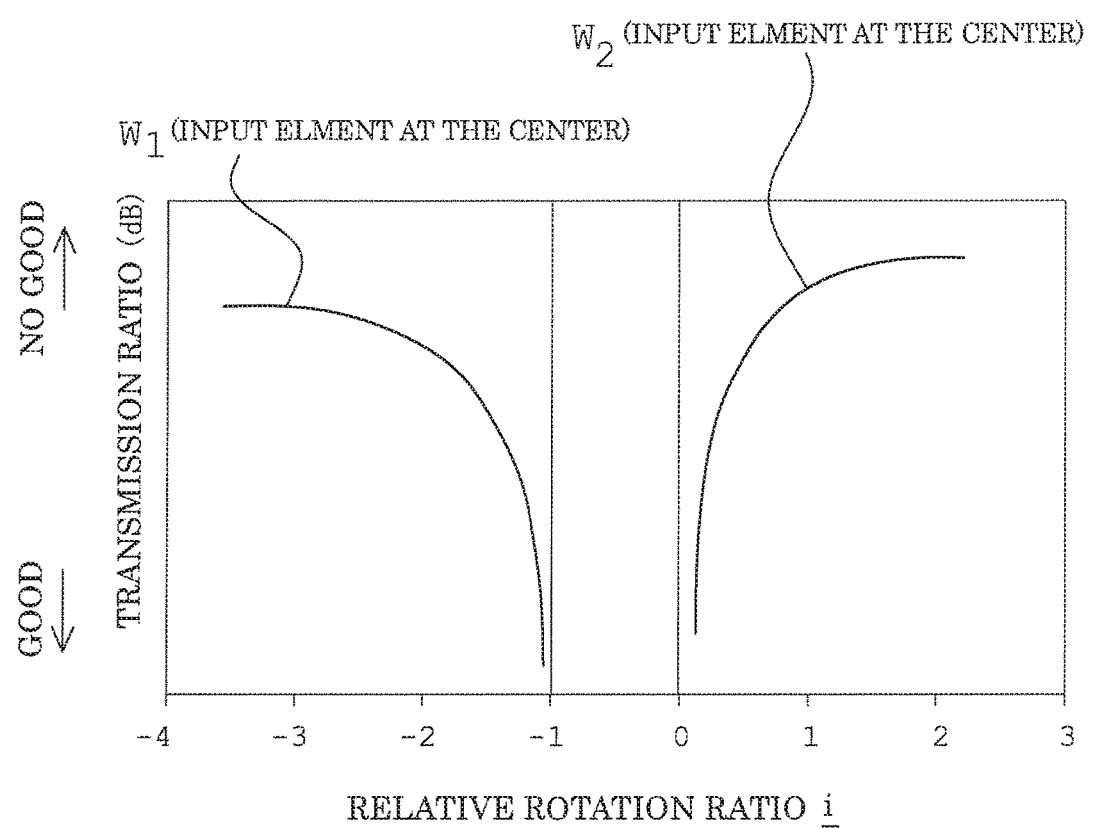
FIG. 17 shows graphs schematically illustrating relationships of the transmission rate with respect to the relative rotating ratio i incase where the central element is constructed by an inlet element and in case where the central element is constructed by an outlet element, respectively.

In order to clarify these facts, FIG. 17 show curve $W_1$, which schematically illustrates a relationship between the relative rotation ratio i and the transmission rate and, from the curve, it is clear that a reduction of the transmission rate is obtained as the value of the relative rotation ratio i approaches toward a value of −1.0 from the side of larger minus value. Namely, the curve $W_1$ is a relationship between the relative rotation ratio i and the transmission rate when the central element is the inlet element and shows clearly that a value of the relative rotation ratio i, which is close to −1.0, is desirable. The fact that the relative rotation ratio i is near to −1 is obtained by a suitable setting of numbers of teeth of the respective rotating elements of planetary gear apparatus 32 in such a manner that a value of the planetary gear ratio i of the mass element (small diameter sun gear 40), that is the position of the mass element, is located as close as possible to a value of the planetary gear ratio i of the inlet element (large diameter sun gear 38) as shown by dotted line D in FIG. 15, on one hand, and, on the other hand, the value of rotating displacement $\theta_3$ of the mass element (small diameter sun gear 40) is reduced in the direction directed toward the value of rotating deviation $\theta_2$ of the outlet element (carrier 36) and is thus decreased to a value close to the value of rotating deviation $\theta_1$ of the inlet element (large diameter sun gear 38) as the central element.

Figure 18:
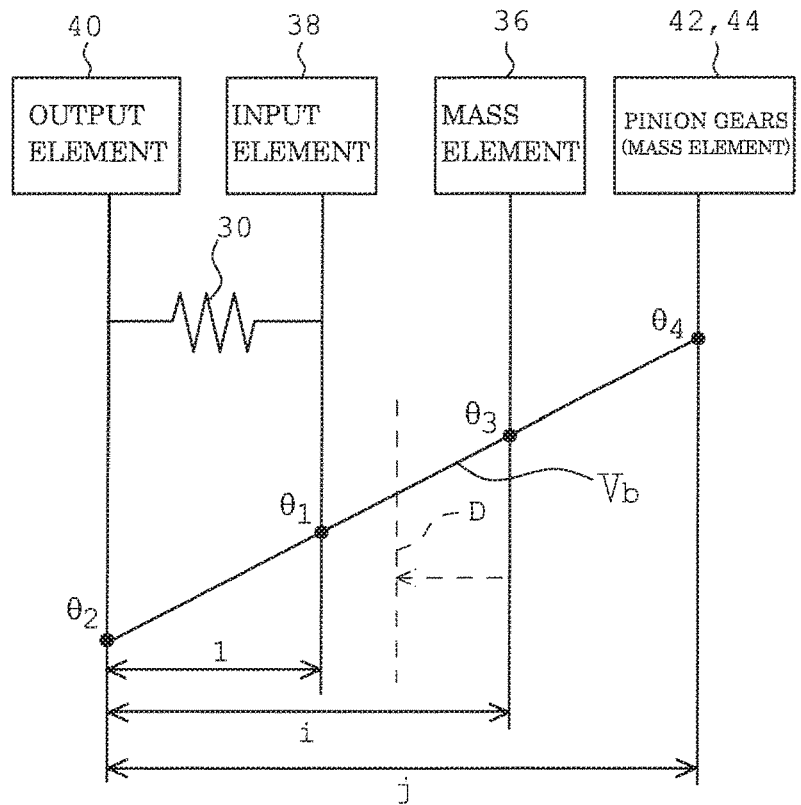
FIG. 18 is a graph showing displacement of each of the rotating elements on the velocity line in the second embodiment of the present invention.

FIG. 18 is a velocity chart in the second embodiment of the present invention shown in FIG. 8 and illustrates a velocity line Vb. In this embodiment, the inlet element is the large diameter sun gear 38, the outlet element is the small diameter sun gear 40 and the mass element is the carrier 36. The large diameter sun gear 38 as the inlet element is located at the center among the essential three elements on the velocity line. A setting of numbers of teeth of the respective rotating elements of the planetary gear apparatus in this embodiment is done in a manner that a value of the relative rotation ratio i is decreased toward zero as shown by the curve $W_2$ in FIG. 17, i.e., a value of the rotating displacement $\theta_3$ of the mass element becomes to be close to the value of the rotating displacement $\theta_1$ of inlet element as the central element.

FIG. 19 shows a model structure for calculating a rotational fluctuation in a modified embodiment of the third embodiment shown in FIG. 10. This modified embodiment is different from the third embodiment in that the pinions 42 and the large diameter pinions 44 are swapped and in that the carrier 36 is made to function as the inlet element, the small diameter ring gear 64 meshing with the small diameter pinions 42 to function as the outlet element and the large diameter ring gear 66 meshing with the large diameter pinions 44 to function as the mass element. The model structure in FIG. 19 of this modified embodiment is obtained in the similar idea as explained with reference to FIG. 14 for a calculation of the rotational fluctuation during the lock up operation. In FIG. 20, rotational displacements of the inlet element (carrier 36), the outlet element (small diameter ring gear 64) and the mass element (large diameter ring gear 66) are expressed on the velocity chart, as similar to the velocity chart in FIG. 2. As similar to the velocity line V or V' in FIG. 2, a velocity line Vb is shown in FIG. 20, on which velocity line a rotational displacement $\theta_1$ of the inlet element (carrier 36), a rotational displacement $\theta_2$ of the outlet element (small diameter ring gear 64) and a rotational displacement $\theta_3$ of the mass element (large diameter ring gear 66) are located. As similar to FIG. 2, a rotational displacement $\theta_4$ of the pinions 42 and 44 functioning as mass elements are shown in the velocity line Vb. As explained with reference to FIG. 15, the abscissa shows the planetary gear ratio. The rotational displacement $\theta_1$ as the reference is that of the inlet element (carrier 36) and the inclination of the velocity line Vb is reversed as that of FIG. 15. Furthermore, the position of the pinions 42 and 44 is also reversed and is located at the planetary gear ratio j from the outlet element (small diameter ring gear 64) in plus side of the sign. When the planetary gear ratio between the inlet element (carrier 36) and the outlet element (small diameter ring gear 64) is assumed to be 1, the central element located at the center on abscissa indicating the planetary gear ratio is the small diameter ring gear 64 as the outlet element. In this case, from the equation (3), it is clear that a difference of the planetary gear ratio of the mass element (large diameter ring gear 66) to the planetary gear ration of the outlet element (small diameter ring gear 64) as the central element becomes to be, as is, the relative rotation ratio i. As a result of numerical calculations of the equations of motion (1) and (2), the relationship between the relative rotating ratio i and the transmission rate is obtained as shown by the curve $W_2$. It is seen from the curve $W_2$ that a reduction of the transmission rate of the torque fluctuation is obtained as the relative rotating ratio approaches to zero from a larger plus value side. In order to obtain a value of the relative rotating ratio i close to zero, FIG. 20 indicates that a setting of numbers of teeth of the respective rotating elements of the planetary gear device 32 is needed in such a manner that, in FIG. 20, the value of the planetary gear ratio i of the mass element (large diameter ring gear 66) should, as shown by dotted lines E, made to be as close as possible to the value of the planetary gear ratio i of the outlet element (small diameter ring gear 44) as the central element, i.e., in such a manner that the value of the rotating deviation $\theta_3$ of the mass element (large diameter ring gear 66) increases to a value near the value of the rotating deviation $\theta_2$ of the outlet element (small diameter ring gear 64) as the central element.

FIG. 21 shows a velocity chart of the forth embodiment as explained with reference to FIG. 12, in which a velocity line Vc is shown. In the embodiment, the inlet element is the large diameter sun gear 66, the outlet element is the carrier 36 and the mass element is the small diameter sun gear 40. The velocity chart of the forth embodiment is similar to that in FIG. 20 in that the outlet element (carrier 36) is located at the center among the three essential elements. A setting of numbers of the teeth of the respective rotating elements of the planetary gear device should therefore be such that a value of the relative rotating ratio i is close to zero as shown by dotted lines F in accordance with the curve $W_2$ in FIG. 17, i.e., such that a value of the rotating displacement $\theta_3$ of the mass element is increased to a value close to a value of the rotating displacement $\theta_2$ of the small diameter ring gear 64 as the central element. This forth embodiment is different from the other embodiments in that an additional or fourth rotating element, that is the small diameter ring gear 64, is provided and that the damper springs 30 are arranged not between the inlet and outlet elements as in the foregoing other embodiments but between the small diameter ring gear 64 as the additional rotating element and the carrier 36 as the outlet element. This manner of the arrangement of the damper springs 30 in the fourth embodiment is advantageous over the structure of the arrangement of the damper springs between the inlet and outlet elements in that the degrees of deformations of the damper springs 30 are reduced with respect to the same degree of the displacement, resulting in a larger rotating displacement to be allowed.

The above is an explanation of the results of movement analysis when the inlet element or the outlet element is arranged at the center of the velocity line, which results show that the value of the relative rotation ratio i is expressed by the equation i<0 when the outlet element is arranged at the center and the value of the relative rotation ratio i is expressed by the equation –i<–1 when the inlet element is arranged at the center. An arrangement of the mass element at the center makes, however, the results of movement analysis to be different and an equation –1<i<0 is now obtained. The arrangement of the mass element at the center is an alternative of an arrangement of the damper springs 30 between the mass element and the outlet element as shown in FIG. 22 (a) or an arrangement of the damper springs 30 between the mass element and the inlet element as shown in FIG. 22 (b). A possibility of an arrangement of the damper springs 30 located between the inlet and the outlet may be eliminated from the consideration, since the latter arrangement does not provide any improvement in the transmission rate due to the fact that any reduction can not be obtained as to an equivalent inertia nor as to an equivalent rigidity. In case of the arrangement in FIG. 22 (a), where the damper springs 30 are arranged between the mass element and the outlet element, a reduction of a transmission rate of torque fluctuation is obtained when the relative rotation ratio i is increased from –1 to 0 as shown by a curve $W_3$ in FIG. 23. Namely, a desired characteristic of the transmission rate is obtained by positioning, along the velocity line Vd in FIG. 22 (a), the rotating displacement $\theta_3$ of the mass element as close as possible to the rotating displacement $\theta_2$ of the outlet element as the connected side to the damper springs 30, as illustrated by dotted lines G so that the value of the relative rotating ratio is as close as possible to zero. Contrary to this, in case of the arrangement in FIG. 22 (b), where the damper springs 30 are arranged between the mass element and the inlet element, a reduction of a transmission rate of torque fluctuation is obtained when the relative rotation ratio i is reduced from 0 to –1 as shown by a curve $W_4$ in FIG. 23. Namely, a desired characteristic of the transmission rate is obtained by positioning, along the velocity line Ve in FIG. 22 (b), the rotating displacement $\theta_3$ of the mass element as close as possible to the rotating displacement $\theta_2$ of the inlet element as the connected side to the damper springs 30, as illustrated by dotted lines H so that the value of the relative rotating ratio is as close as possible to –1. It should be noted that the pinions are not shown in FIG. 22 unlike FIGS. 2, 15, 18, 20 and 21, because a position of the pinions on the velocity line is not determined due to the fact that an allocation of the specific rotating elements of the planetary gear device is not done as to the inlet element nor the outlet element.

In the above results for calculations in vibration models, a statement that a value of the relative rotating ratio i close to 1 is desirable means that a value of the relative rotating ratio i should be as close as possible to –1 so long as a value of the relative rot ratio i does not conform to –1. In addition, a statement that a value of the relative rotating ratio i close to zero is desirable means that a value of the relative rotating ratio i should be as close as possible to zero so long as a value of the relative rot ratio i does not conform to zero, Namely, in case of i=–1 or i=0, the terms including the moment of inertia $I_3$ of the mass element in the above mentioned equations of motion (1) and (2), that are $$i(1+i)I_3 \times \frac{d^2\theta_2}{dt^2} \text{ and } i(1+i)I_3 \times \frac{d^2\theta_1}{dt^2}$$

are always nullified, which makes the equations (1) and (2) to be meaningless, because any function as a dynamic damper can not be obtained. Namely, as for the operation of the dynamic damper, the case that is i=–1 or i=0 should be excluded.

Examples of Calculations of Relative Rotating Ratio i

Finally, examples of calculations of the relative rotating ratio i according to the present invention in comparison with prior art will now be explained. In the Patent Document 1 (JPP H11-159595), a conventional planetary gear device is used and the carrier is as the inlet element, the sun gear as the outlet element and the ring gear as the mass element. A velocity chart will be the same as that shown in FIG. 15. Suppose the number of teeth of the ring gear, Zr is 120. The number of teeth of the sun gear, Zs as small as possible is desirable but regards that it is one third of the number of teeth of the ring gear, i.e., Zs=40. In this case, the number of teeth of the pinions, Zp must be 40 (Zp=40). The relative rotating ratio i is obtained as follows.

$$i = -\frac{Zr+Zs}{Zr} = -\frac{120+40}{120} = -1.33$$

Contrary to this, in the third embodiment of the present invention in FIG. 10, wherein the small diameter ring gear 64 is as the inlet element, the carrier 36 as the outlet element and the large diameter ring gear 66 as the mass element and a velocity chart will be expressed as similar to that shown in FIG. 15. Suppose that a number of teeth of the large diameter ring gear 66, Zlr is also 120, a number of the teeth of the large diameter pinion 44 of the planetary gear 34, Zlp is 20 and a number of the teeth of the small diameter pinion 42 of the planetary gear 34, Zsp is 18, the number of a teeth of the small diameter ring gear 64, Zsr is 118. From these values, the relative rotation ratio i can be calculated as follows.

$$i = -\frac{Zsr \times Z1p}{Z1r \times Zsp} = -\frac{118 \times 20}{120 \times 18} = -1.09$$

It will be clear from the above that the present invention makes it possible that a value of the relative rotation ratio i in the case of the inlet element as the central element can be located more closer to −1, which is clearly desirable from the curve $W_1$ as shown in the left half side of FIG. 17.

As another prior art, an example of calculations in the Patent Document No. 2 (JPP 2010-101380) will be explained, where a carrier as the outlet element is located at the center and its velocity chart will be similar to that shown in FIG. 20. In order to obtain a value of the relative rotation ratio i close to zero in view of the curve $W_2$ at the right hand half of FIG. 17 indicating the characteristic of the relative rotation ratio i when the central element is the inlet element, the number of teeth of the pinion as used, Zp is set to the minimum value 18, i.e., Zp=18. The number of teeth of the sun gear, Zr can be obtained as follows.

Zs=Zr−2×Zp=120−2×18=84

The relative rotation ratio i is obtained as follows.

$$i = -\frac{Zr}{Zs} = \frac{120}{84} = 1.43$$

This means that the prior art cannot obtain the value of relative rotation ratio i as close sufficiently to zero. In contrast, the same kind of calculations are done in the construction of the present invention as shown in FIG. 19 as a modification of the embodiment in FIG. 10, wherein the pinions 42 and the large diameter pinions 44 are swapped from the arrangement as shown in FIG. 10 and wherein the carrier 36 is made to function as the inlet element, the small diameter ring gear 64 meshing with the small diameter pinions 42 is made to function as the outlet element and the large diameter ring gear 66 meshing with the large diameter pinions 44 is made to function as the mass element. Namely, as similar to the above example of calculations, the number of teeth of large diameter ring gear 66 as the mass element, Zlr is 120 (Zlr=120), the number of the small pinion 42, Zlp is 20 (Zlp=20) and the number of teeth of the small diameter ring gear, Zsr is 20 (Zsr=118), a value of the relative rotation ratio i is obtained as follows.

$$i = \frac{Zsr \times Z1p}{Z1r \times Zsp} - 1 = \frac{118 \times 20}{120 \times 18} - 1 = 0.09$$

This means that the relative rotation ratio i has a value sufficiently close to zero, which is ideally desirable as shown by the curve $W_2$ at the right hand half part of FIG. 17, which shows the characteristic of the relative rotation ratio i in case where the central element is the outlet element.

EXPLANATION OF REFERENCE NUMERALS

10: Housing
12: Pump Impeller
14: Turbine Blade
16: Stator
18: Piston Plate
20: Dynamic Damper
22: Hub
26: Friction Member
30: Spring Member (Damper Spring)
30-1, 30-2: Coil Spring constructing Spring Member
32: Planetary Gear Device
36: Carrier
38: Large Diameter Sun Gear
40: Small Diameter Sun Gear
44: Large Diameter Pinion
46: Small Diameter Pinion
46: Pinion Pin
48: Needle Bearing
54: Drive Plate
56: Equalizer Plate
58: Driven Plate
60A, 60B: Spring Retainer
64: Small Diameter Ring Gear
66: Large Diameter Ring Gear

The invention claimed is:

1. A dynamic damper for transmitting torque from an input side to an output side, said dynamic damper comprising:
    a planetary gear device comprising:
        a plurality of double pinion planetary gears spaced along a circumferential direction, each double pinion planetary gear having a first pinion and a second pinion of different numbers of teeth arranged integrally and rotatably in an axially juxtaposed relationship with each other;
        at least two rotating gears, which are structured to mesh with the first and the second pinions, respectively, at least at an inner side and an outer side, respectively, of corresponding rotating gears, and
        a carrier structured to rotatably support the plurality of double pinion planetary gears, wherein one of the carrier or the at least two rotating gears among two selected from the carrier and the at least two rotating gears is configured to connect to the input side, and another of the carrier or the at least two rotating gears among the selected two of the carrier and the at least two rotating gears is configured to connect to the output side, and
    springs arranged so as to bypass the selected two from the carrier and the at least two rotating gears and so as to connect the input side with the output side, such that said springs transmit power from the input side to the output side, wherein, among said carrier and the at least two rotating gears, a remaining one or more of the carrier or the at least two rotating gears does not transmit power or is configured as a damper mass.

2. The dynamic damper according to claim 1, wherein said at least two rotating gears include a first sun gear and a second sun gear structured to mesh, at respective outer surfaces thereof, with the first pinion and the second pinion, respectively, of respective ones of the plurality of double pinion planetary gears, wherein one of the first sun gear, the second sun gear or the carrier is connected to the input side and another one of the first sun gear, the second sun gear or the carrier is connected to the output side, wherein said springs are structured to connect any of two selected from the first sun gear, the second sun gear or the carrier with each other, such that the selected two of the first sun gear, the second sun gear or the carrier transmit power from the input side to the output side, and wherein a remaining one of the first sun gear, the second sun gear or the carrier, which does not transmit power, is configured as the damper mass.

3. The dynamic damper according to claim 1, wherein:

said at least two rotating gears include a first ring gear and a second ring gear, which are structured to mesh, at respective inner surfaces thereof, with the first pinion and the second pinion, respectively, of respective ones of the plurality of double pinion planetary gears, wherein one of the first ring gear, the second ring gear or the carrier is connected to the input side and another one of the first ring gear, the second ring gear or the carrier is connected to the output side, wherein said springs are structured to connect any of two selected from the first ring gear, the second ring gear or the carrier with each other, such that the selected two of the first ring gear, the second ring gear, or the carrier transmit power from the input side to the output side, and wherein a remaining one of the first ring gear, the second ring gear or the carrier, which does not transmit power, is configured as the damper mass.

4. A dynamic damper for transmitting torque from an input side to an output side, said dynamic damper comprising:

a planetary gear device comprising:

a plurality of double pinion planetary gears spaced along a circumferential direction, each double pinion planetary gear having a first pinion and a second pinion of different numbers of teeth arranged integrally and rotatably in an axially juxtaposed relationship with each other;

at least two rotating gears, which are structured to mesh with the first and the second pinions, respectively, at least at an inner side and an outer side, respectively, of corresponding rotating gears, and a carrier structured to rotatably support the plurality of double pinion planetary gears, wherein one of the carrier or the at least two rotating gears among two selected from the carrier and the at least two rotating gears is configured to connect to the input side, and another of the carrier or the at least two rotating gears among the selected two of the carrier and the at least two rotating gears is configured to connect to the output side, and springs arranged so as to bypass the selected two among the carrier and the at least two rotating gears and so as to connect the input side with the output side, such that said springs transmit power from the input side to the output side, wherein, among said carrier and the at least two rotating gears, a remaining one or more of the carrier or the at least two rotating gears does not transmit power or is configured as a damper mass, wherein, in addition to the at least two rotating gears, the dynamic damper further comprises at least one further rotating, and wherein the springs are arranged between said at least one further rotating gear and said at least two rotating gears, which are configured to connect to the input side or the output side.

* * * * *